US010165469B2

(12) United States Patent
Kim et al.

(10) Patent No.: US 10,165,469 B2
(45) Date of Patent: Dec. 25, 2018

(54) MULTI-TIER CLUSTERING APPARATUS IN WIRELESS COMMUNICATION SYSTEM AND METHOD THEREOF

(71) Applicants: Samsung Electronics Co. Ltd., Suwon-si, Gyeonggi-do (KR); Korea Advanced Institute of Science and Technology, Daejeon (KR)

(72) Inventors: Tae-Young Kim, Seongnam-si (KR); Tae-Soo Kwon, Vancouver (CA); Ju-Yong Lee, Daejeon (KR); Ji-Yun Seol, Seongnam-si (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 277 days.

(21) Appl. No.: 13/855,261

(22) Filed: Apr. 2, 2013

(65) Prior Publication Data
US 2013/0260772 A1 Oct. 3, 2013

(30) Foreign Application Priority Data
Apr. 2, 2012 (KR) .................. 10-2012-0033988

(51) Int. Cl.
*H04W 28/16* (2009.01)
*H04W 28/18* (2009.01)
*H04W 72/08* (2009.01)

(52) U.S. Cl.
CPC ......... *H04W 28/16* (2013.01); *H04W 72/085* (2013.01)

(58) Field of Classification Search
CPC ............... H04W 72/048; H04W 48/20; H04W 28/0226; H04W 28/16; H04W 72/085; H04W 72/087
USPC ................................ 455/410, 411; 726/4, 27
See application file for complete search history.

(56) References Cited

U.S. PATENT DOCUMENTS

| | | | | |
|---|---|---|---|---|
| 5,722,043 A * | 2/1998 | Rappaport | ............ | H04W 16/06 455/447 |
| 5,974,320 A * | 10/1999 | Ward et al. | .................. | 455/437 |
| 6,522,888 B1 * | 2/2003 | Garceran | .............. | H04W 16/18 455/423 |
| 7,650,152 B2 * | 1/2010 | Li | ........................ | H04L 1/0003 370/343 |
| 7,957,743 B2 * | 6/2011 | Moe et al. | ..................... | 455/439 |
| 2007/0207742 A1 | 9/2007 | Kim et al. | | |
| 2008/0188215 A1 * | 8/2008 | Bergstrom et al. | ........... | 455/424 |

(Continued)

FOREIGN PATENT DOCUMENTS

EP        2538603        *    6/2011

*Primary Examiner* — Julio Perez
(74) *Attorney, Agent, or Firm* — Jefferson IP Law, LLP

(57) ABSTRACT

An apparatus and a method for configuring and managing/controlling a cluster, which is a set of Base Stations (BSs) for transmitting signals cooperatively, are provided. The method includes broadcasting cluster set information indicating information about a plurality of clusters including a serving BS to a User Equipment (UE), receiving a report of information about Received Signal Strength Indicators (RSSIs) of control signals transmitted from BSs included in the plurality of clusters from the UE, and assigning any one of the plurality of clusters to a cluster for servicing the UE based on the information about the RSSIs of the control signals.

24 Claims, 18 Drawing Sheets

(56) References Cited

U.S. PATENT DOCUMENTS

| | | |
|---|---|---|
| 2008/0280635 A1* | 11/2008 | Lei et al. .................... 455/513 |
| 2009/0028112 A1 | 1/2009 | Attar et al. |
| 2009/0303928 A1 | 12/2009 | Chun et al. |
| 2010/0042716 A1 | 2/2010 | Farajidana et al. |
| 2010/0210285 A1* | 8/2010 | Pande et al. ............. 455/456.1 |
| 2010/0214997 A1* | 8/2010 | Tao ...................... H04W 16/12 370/329 |
| 2010/0304773 A1 | 12/2010 | Ramprashad |
| 2011/0116480 A1 | 5/2011 | Li et al. |
| 2011/0183669 A1* | 7/2011 | Kazmi ........................ 455/434 |
| 2011/0244906 A1* | 10/2011 | Amin ..................... H04B 7/024 455/509 |
| 2011/0286349 A1* | 11/2011 | Tee et al. .................... 370/252 |
| 2011/0294527 A1* | 12/2011 | Brueck ................ H04W 24/02 455/466 |
| 2012/0315917 A1* | 12/2012 | Comeau et al. .......... 455/456.1 |

* cited by examiner

ND METHOD THEREOF

MULTI-TIER CLUSTERING APPARATUS IN WIRELESS COMMUNICATION SYSTEM AND METHOD THEREOF

PRIORITY

This application claims the benefit under 35 U.S.C. § 119(a) of a Korean patent application filed on Apr. 2, 2012 in the Korean Intellectual Property Office and assigned Serial No. 10-2012-0033988, the entire disclosure of which is hereby incorporated by reference.

BACKGROUND OF THE INVENTION

1. Field of the Invention

The present invention relates to a mobile communication system. More particularly, the present invention relates to an apparatus and a method for configuring and managing/controlling a cluster, which is a set of Base Stations (BSs) for transmitting signals cooperatively.

2. Description of the Related Art

A cellular system, such as a mobile communication system, is a system proposed to overcome a limitation of a service area and a limitation of subscriber accommodation capacity. In this cellular system, several methods of increasing capacity of the system, such as a method of increasing the number of channels per unit size, and the like, have been actively studied.

Recently, in a communication network, such as a Virtual Cellular Network (VCN), several methods of increasing capacity of a system have been also considered. The VCN provides environments in which BSs reuse their space with one another and share data with one another. For example, small BSs capable of being easily installed/changed/deleted are placed in a VCN based on wireless backhaul. Because of sharing data among the BSs, if interference between clusters which are a set of the limited number of data sharing small BSs may be addressed, it is possible to increase capacity of a system. However, because the number of cooperative BSs considering a backhaul/complexity/channel estimation overhead is limited in VCN environments, an interference problem between clusters has been generated.

A disjoint clustering method and an overlapped clustering method have been proposed as methods of addressing interference between clusters. In accordance with the disjoint clustering method, clustering between BS clusters is performed to apply network Multi-Input Multi-Output (MIMO). Herein, each of the clusters is equipped with disjoint BS subsets. However, although the disjoint clustering method is performed, because there still is the interference problem between clusters, the fact that a solution for an interference problem between clusters of low complexity is requested is disclosed by L. Wang, C. J. Yeh who published "3-cell network MIMO architectures with sectorization and fractional frequency reuse" on June 2011 in the Institute of Electrical and Electronics Engineers (IEEE) Journal in Selected Areas of Communications (JSAC).

In accordance with the overlapped clustering method, it is permitted that each BS may belong to two or more clusters and a generation frequency of an interference problem between users who are located on a boundary between clusters is minimized. In one example, a multi-cell network MIMO scheduling method was proposed by S. Kaviani and W. A. Krzymien who published "Multicell scheduling in network MIMO" in Globecom 2010. However, in this method, complexity for a beamforming configuration is increased in comparison with performance improvement. In addition, the method is not linked to resource allocation, such as frequency reuse. In another example, a "intertwined clustering" method for forming different cluster patterns while being classified according to time/frequency resources was proposed, according to the invention, which is filed on May 24, 2010 to have a patent application Ser. No. 12/786,285, is published on Dec. 2, 2010 to have a patent publication number 2010/0304773, and is entitled "A method for selective antenna activation and per antenna or per antenna group power assignments in cooperative signaling wireless MIMO systems", by inventor Sean A. Ramprashad. However, this method has a limitation of a concept level or a limitation that only an operation in fixed BS distribution environments based on hexagonal cells is considered.

Therefore, a need exists for an apparatus and a method for configuring and managing/controlling a cluster which is a set of BSs for transmitting signals cooperatively.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and a method for managing a corresponding cluster set by Base Stations (BSs) under multi-tier clustering environments.

Another aspect of the present invention is to provide an apparatus and a method for assigning a serving cluster by User Equipment (UE) under multi-tier clustering environments.

Another aspect of the present invention is to provide a processing method between BSs and a UE, for determining a cluster which services the UE under multi-tier clustering environments, and an apparatus therefor.

Another aspect of the present invention is to provide a processing method between BSs and a UE, for determining a cluster which services the UE under multi-tier clustering environments and changing the UE according to movement of a user, and an apparatus therefor.

In accordance with one aspect of the present invention, a processing method in a serving BS for determining a cluster which services a UE in a wireless communication system which includes the serving BS, a plurality of Distributed BSs (DBSs) including peripheral BSs for cooperating with the serving BS and for configuring clusters, and the UE, is provided. The processing method includes broadcasting cluster set information indicating information about a plurality of clusters including the serving BS to the UE, receiving a report of information about Received Signal Strength Indicators (RSSIs) of control signals transmitted from BSs included in the plurality of clusters from the UE, and assigning any one of the plurality of clusters to a cluster for servicing the UE based on the information about the RSSIs of the control signals.

In accordance with another aspect of the present invention, a processing method in a UE for determining a cluster which services the UE in a wireless communication system which includes a serving BS, a plurality of DBSs including peripheral BSs for cooperating with the serving BS and for configuring clusters, and the UE, is provided. The processing method includes receiving cluster set information indicating information about a plurality of clusters, which is broadcasted from the serving BS, measuring RSSIs of control signals transmitted from BSs included in the plurality of clusters, reporting information about the measured RSSIs to the serving BS, and allowing the serving BS to assign any one cluster selected among the plurality of clusters to a serving cluster for a data service based on the information about the RSSIs of the control signals.

In accordance with another aspect of the present invention, a serving BS apparatus for determining a cluster which services a UE in a wireless communication system which includes a serving BS, a plurality of DBSs including peripheral BSs for cooperating with the serving BS and for configuring clusters, and the UE is provided. The serving BS apparatus includes a cluster information managing unit for storing information about a plurality of clusters including the serving BS, a signal generating unit for generating cluster set information indicating information about the plurality of clusters, a transmitter for broadcasting the generated cluster set information to the UE, and a receiver for receiving a report of information about RSSIs of control signals transmitted from BSs included in the plurality of clusters from the UE, wherein the cluster information managing unit manages the information about the RSSIs of the controls signals, and maintains and manages the information about the clusters including the corresponding serving BS.

In accordance with another aspect of the present invention, a UE apparatus for determining a cluster which services a UE in a wireless communication system which includes a serving BS, a plurality of DBSs including peripheral BSs for cooperating with the serving BS and for configuring clusters, and the UE is provided. The UE apparatus includes a receiver for receiving cluster set information indicating information about a plurality of clusters, which is broadcasted from the serving BS, an RSSI measuring unit for measuring RSSIs of control signals transmitted from BSs included in the plurality of clusters, and a transmitter for reporting information about the measured RSSIs to the serving BS, wherein the receiver receives a message from the serving BS which assigns any one cluster selected among the plurality of clusters to a serving cluster for a data service based on the information about the RSSIs of the control signals.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition description of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
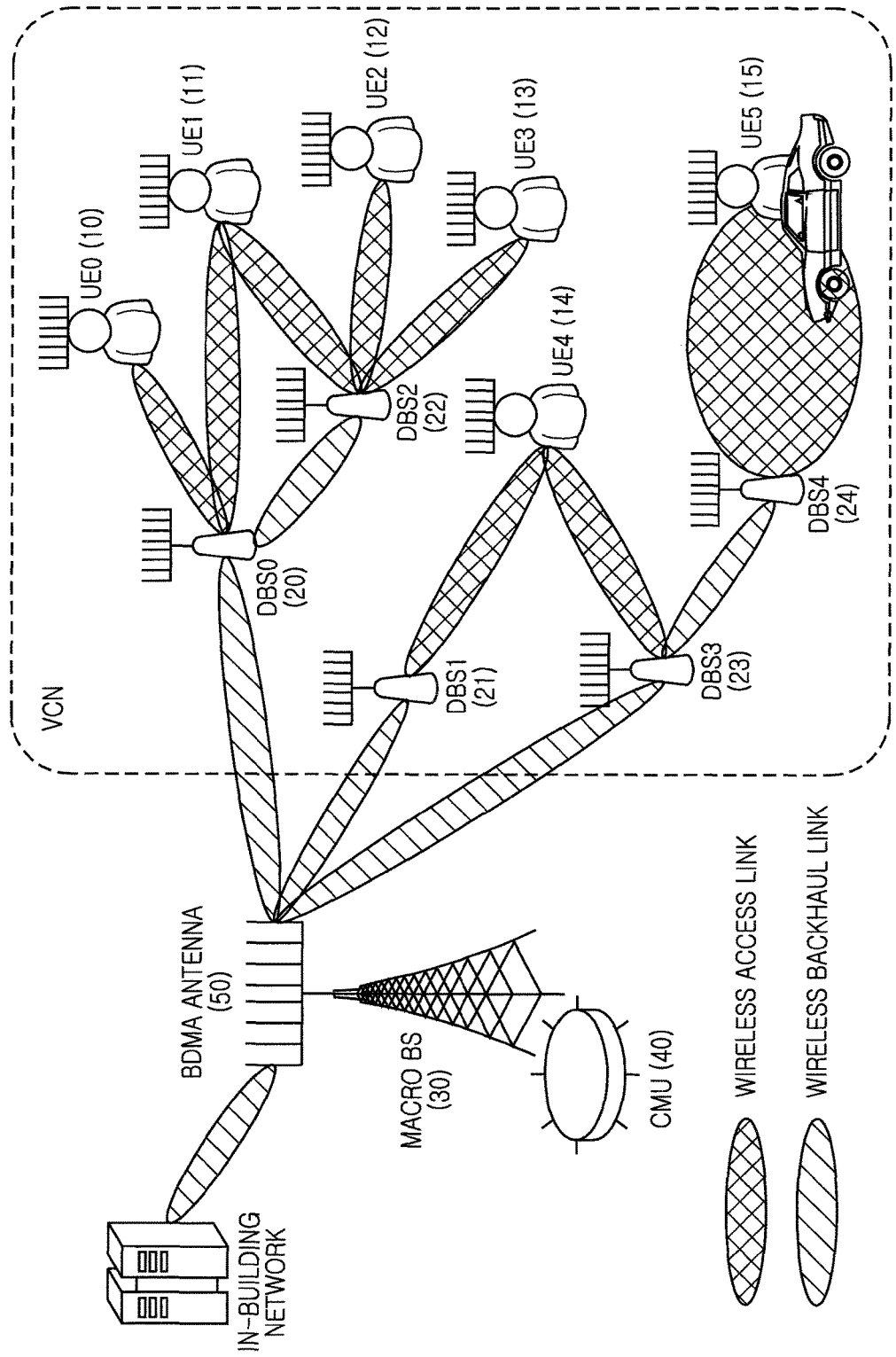
FIG. 1 illustrates a wireless communication system according to an exemplary embodiment of the present invention.

FIG. 1 illustrates a wireless communication system according to an exemplary embodiment of the present invention.

Referring to FIG. 1, the wireless communication system includes a plurality of User Equipments (UEs) UE0 10 to UE5 15, a plurality of Distributed Base Stations (DBSs) DBS0 20 to DBS4 24, a macro BS 30 of an upper node of the DBS0 20 to the DBS4 24, and a Central Management Unit (CMU) 40. The CMU 40 is a central control device for controlling cooperative transmission and reception of the DBS0 20 to the DBS 4 24, and may be included in the macro BS 30. The DBS0 20 to the DBS4 24 perform Multi-Input Multi-Output (MIMO) cooperative transmission and reception and configure a cooperative cluster. The DBS0 to the DBS4 24 include all or some functions of general BSs.

The macro BS 30 supports a wireless backhaul function of each of the DBS0 20 to DBS4 24, and includes a Beam Division Multiple Access (BDMA) antenna 50. Each of the DBS0 20 to the DBS4 24 and each of the UE0 10 to the UE5 15 include an antenna corresponding to the BDMA antenna 50 to perform cooperative transmission and reception. The macro BS 30 and the DBSs are connected through a wireless backhaul link and the DBSs are connected through a wireless backhaul link. For example, the macro BS 30 and each of the DBS0 20, the DBS1 21, and the DBS2 23 are connected through the wireless backhaul link. In addition, the DBS0 20 and the DBS2 22 are connected through the wireless backhaul link, and the DBS3 23 and the DBS4 24 are connected through the wireless backhaul link. Each of the UE0 10 to the UE5 15 and each of the DBS0 20 to the DBS4 24 are connected through a wireless access link. For example, the UE0 10 and the UE1 11 are connected to the DBS0 20 through the wireless access link, and the UE1 11, the UE2 12, and the UE3 13 are connected to the DBS2 22 through the wireless access link. The UE4 14 are connected to the DBS1 21 through the wireless access link, and the UE4 14 is connected to the DBS 3 23 through the wireless access link. The UE5 15 is connected to the DBS4 24 through the wireless access link.

As shown in FIG. 1, exemplary embodiments of the present invention described below may be applied to an outdoor Virtual Cellular Network (VCN) environment in which a plurality of cooperated DBSs are distributed. In addition, exemplary embodiments of the present invention may also be applied to an outdoor distributed antenna environment and an in-building wireless network environment.

In accordance with exemplary embodiments of the present invention, multi-tier clustering has various types according to an inter-cell interference influence in environments in which BSs are randomly distributed. Herein, one BS is included in clusters of two or more different tiers. For example, one BS has a type which is overlapped to two or more different clusters. As described above, exemplary embodiments of the present invention may minimize an interference problem between clusters according to tier selection by users and may provide flexible environments for adding, changing, or removing BSs.

In accordance with exemplary embodiments of the present invention, a corresponding cluster set management operation by BSs and serving clustering allocation by UEs are performed. For example, a cluster set to which BSs may belong to while being classified according to the BSs which are preset by multi-tier clustering and related information are managed, and a serving cluster is assigned based on interference environments by UEs. Therefore, users may be allocated to a cluster which may minimize an interference influence among previously configured cluster patterns.

Figure 2:
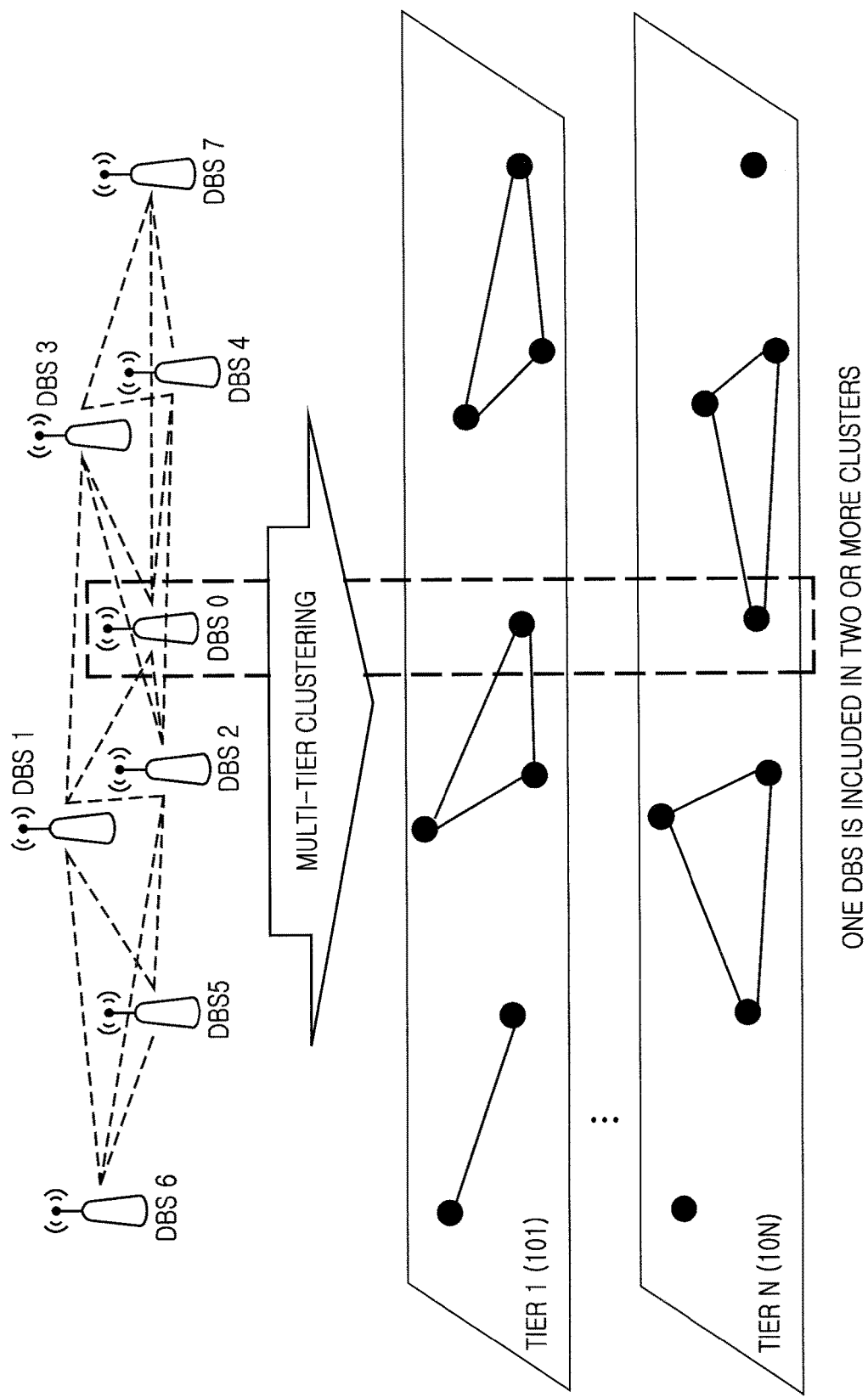
FIG. 2 illustrates a basic concept of multi-tier clustering according to an exemplary embodiment of the present invention.

FIG. 2 illustrates a basic concept of multi-tier clustering according to an exemplary embodiment of the present invention.

Referring to FIG. 2, DBSs DBS0 to DBS7 perform MIMO cooperative transmission and reception. For example, the DBS0 may cooperate with the DBS 1 and the DBS2 which are neighboring BSs. The DBS3 may cooperate with the DBS4 and the DBS7 and the DBS5 may cooperate with the DBS6.

The DBS0 to the DBS7 configure cooperative clusters for cooperative transmission and reception. In a tier 1 101, the DBS0, the DBS1, and the DBS2 configure one cluster, the DBS3, the DBS4, and the DBS7 configure one cluster, and the DBS5 and the DBS6 configure one cluster. In a tier N 10N, the DBS0, the DBS3, and the DBS4 configure one cluster, and the DBS1, the DBS2, and the DBS5 configure one cluster. The DBS0 is included in one cluster of the tier 1 101 and is included in one cluster of the tier N 10N. For example, the DBS0 is included in two or more clusters.

Figure 3:
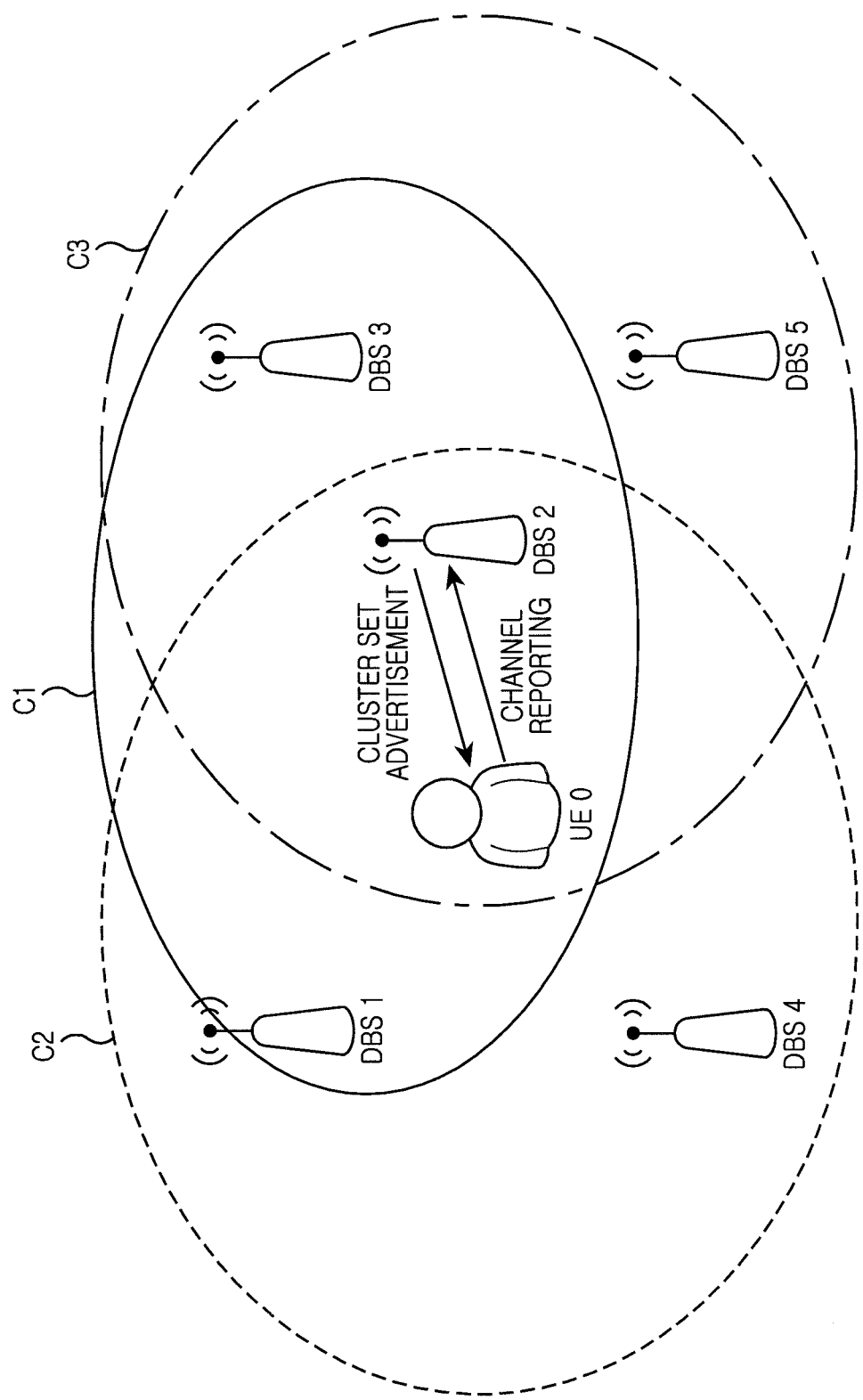
FIG. 3 illustrates a process of managing a cluster set while being classified according to Base Stations (BSs) under a multi-tier clustering structure according to an exemplary embodiment of the present invention.

FIG. 3 illustrates a process of managing a cluster set while being classified according to BSs under a multi-tier clustering structure according to an exemplary embodiment of the present invention.

Referring to FIG. 3, DBS DBS2 is included in clusters C1 to C3, and store information about each of the clusters C1 to C3. The cluster C1 includes a DBS1, the DBS2, and a DBS3. The cluster 2 includes the DBS1, the DBS2, and the DBS4. The cluster C3 includes the DBS2, the DBS3, and a DBS5. In addition, the DBS2 transmits cluster set information to a UE0 and assigns any one of a plurality of clusters while being classified according to UEs.

Figure 4:
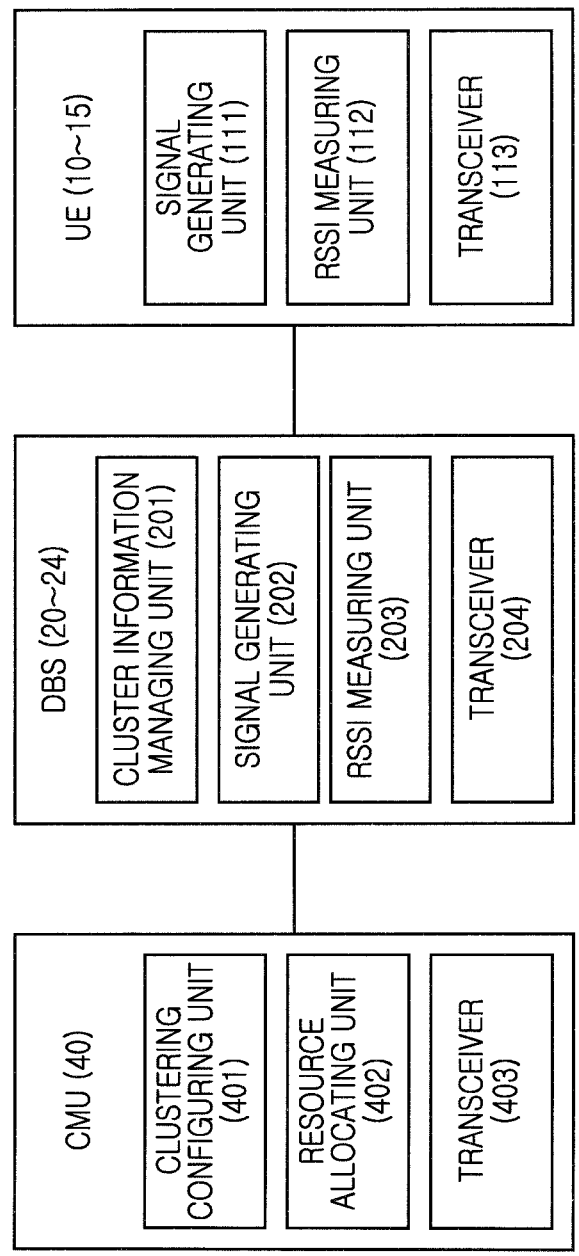
FIG. 4 is a block diagram illustrating a configuration of a system for a multi-tier clustering operation according to an exemplary embodiment of the present invention.

FIG. 4 is a block diagram illustrating a configuration of a system for a multi-tier clustering operation according to an exemplary embodiment of the present invention.

Referring to FIGS. 1 and 4, the CMU 40 includes a multi-tier clustering configuring unit 401, a resource allocating unit 402, and a transceiver 403. The multi-tier clustering configuring unit 401 configures and stores a plurality of cluster patterns in advance, each of which is configured as a disjoint DBS set in certain DBS distribution environments. The resource allocating unit 402 selects one or more clusters while being classified according to UEs among the plurality of cluster patterns and allocates (specifies) a serving cluster. The transceiver 403 transmits and receives signals with the DBSs 20 to 24. For example, the transceiver 403 receives information about a Received Signal Strength Indicator (RSSI) from each of the DBSs 20-24. In addition, the transceiver 403 transmits information about the serving cluster allocated by the resource allocating unit 402 to each of the DBSs 20 to 24. The CMU 40 may be included in the macro BS 30 of FIG. 1.

The DBS 20 includes a cluster information managing unit 201, a signal generating unit 202, an RSSI measuring unit 203, and a transceiver 204. The other DBSs 21 to 24 are configured and operated to be identical to the DBS 20. The cluster information managing unit 201 interworks with the CMU 40 and manages information about clusters including its DBS. In addition, the cluster information managing unit 201 also assigns the serving cluster selected by the CMU 40 to each of UEs 10 to 15. The signal generating unit 202 generates cluster set information indicating information about clusters, which is stored in the cluster information managing unit 201, and generates a pilot signal as a downlink control signal. The RSSI measuring unit 203 measures an RSSI for a control signal transmitted from each of the UEs 10 to 15. The transceiver 204 is responsible for transmitting and receiving signals with each of the UEs 10 to 15, each of the neighboring DBSs 21 to 24, and the CMU 40. For example, the transceiver 204 transmits the control signal and the cluster set information generated by the signal generating unit 202 and receives a control signal from each of the UEs 10 to 15. In addition, the transceiver 204 transmits information about the RSSI measured by the RSSI measuring unit 203 to the CMU 40 and receives the information about the serving cluster, which is transmitted from the CMU 40.

Each of the UEs 10 to 15 includes a signal generating unit 111, an RSSI measuring unit 112, and a transceiver 113. The signal generating unit 111 generates a pilot signal as an uplink control signal and generates information about an RSSI measured by the RSSI measuring unit 112. The RSSI measuring unit 112 measures an RSSI about a control signal received from each of DBSs 20 to 24. The transceiver 113 transmits signals with each of the DBSs 20 to 24. For example, the transceiver 113 receives a downlink control signal transmitted from each of the DBSs 20 to 24. In addition, the transceiver 113 transmits the uplink control signal generated by the signal generating unit 111 and information about the RSSI measured by the RSSI measuring unit 112 to each of the DBSs 20 to 24. The CMU 40 and each of the DBSs 20 to 24 may be connected through a wireless backhaul link. Each of the DBSs 20 to 24 and each of the UEs 10 to 15 may be connected through a wireless access link.

Although the CMU 40, the DBSs 20 to 24, and the UEs 10 to 15 are described with reference to an example shown in FIG. 4, they are functional blocks according to exemplary embodiments of the present invention. It is possible for the CMU 40, the DBSs 20 to 24, and the UEs 10 to 15 to be configured by other blocks for performing the same functions. When the CMU 40, the DBSs 20 to 24, and the UEs 10 to 15 perform operations which are different from exemplary embodiments of the present invention, they may be configured by different blocks.

Figure 5:
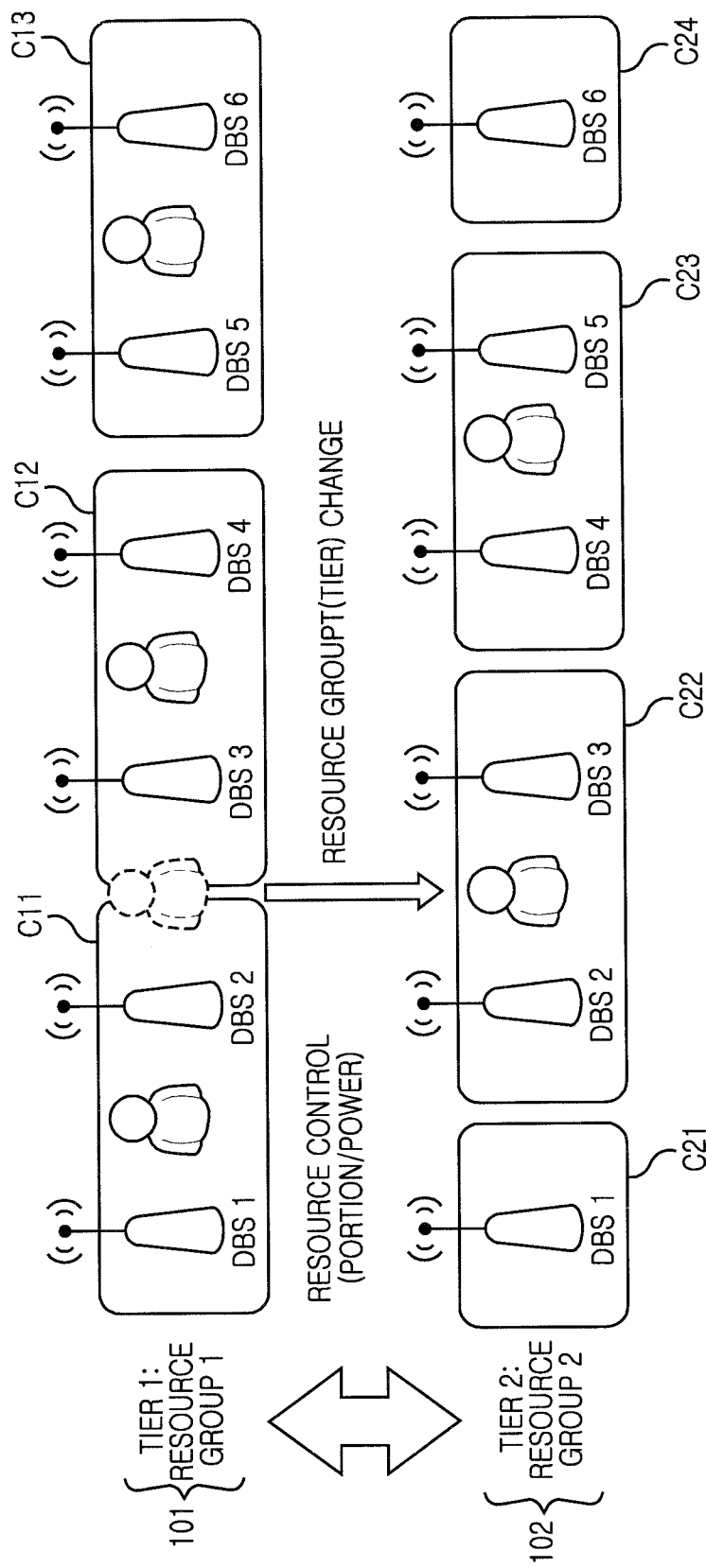
FIG. 5 illustrates a process of a basic operation for illustrating principles of a multi-tier clustering operation according to an exemplary embodiment of the present invention.

FIG. 5 illustrates a process of a basic operation for illustrating principles of a multi-tier clustering operation according to an exemplary embodiment of the present invention.

Referring to FIG. 5, clusters C11 to C13 are included in a tier 1 101. The cluster C11 includes DBSs DBS1 and DBS2. The cluster C12 includes DBSs DBS3 and DBS4. The cluster C13 includes DBSs DBS5 and DBS6. Clusters C21 to C24 are included in a tier 2 102. The cluster C21 includes the DBS1. The cluster C22 includes the DBS2 and the DBS3. The cluster C23 includes the DBS4 and the DBS5. The cluster C24 includes the DBS6. As described above, in accordance with a multi-tier clustering structure, the clusters between tiers have an intertwined type and one DBS may be included in two or more clusters.

In a long-term aspect, the multi-tier clustering structure is configured in advance in consideration of DBS/statistical user distribution. It is possible to perform clustering of various types according to an inter-cell interference influence in environments in which DBSs are randomly distributed. This structure configures a basic framework for long-term resource allocation, such as frequency reuse. Accordingly, the structure minimizes an interference problem in clusters according to tier selection by users and provides a flexible environment for adding, changing, and removing DBSs.

In a mid-term aspect, different resources (e.g., frequencies/time) may be allocated to each tier according to physical position distribution of users. For example, resources are allocated based on a mutual influence of clusters between tiers and by tiers in consideration of a performance limitation (e.g., a transmission power) by DBSs. In another exemplary method, it is possible to consider a generalized algorithm which reuses the same frequency/time resources between clusters which are positioned in different tiers. Therefore, a dynamic topology corresponding to distribution of users and an amount of loads is configured.

In a short-term aspect, a beam control operation according to network MIMO is performed in each of clusters to address a boundary problem between DBS cells.

Figure 6:
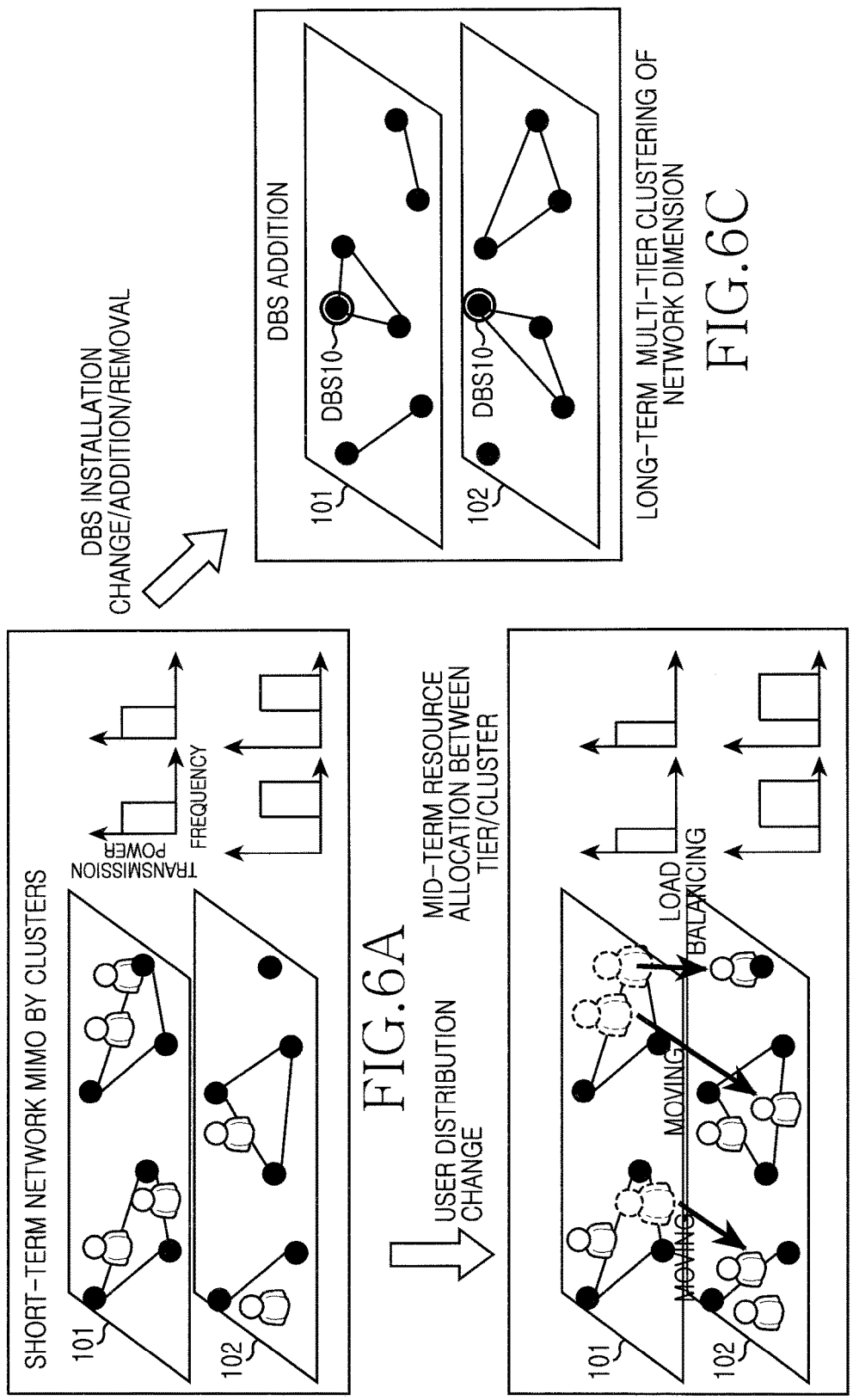
FIGS. 6A through 6C illustrate a process of a multi-tier clustering operation according to an exemplary embodiment of the present invention.

FIGS. 6A through 6C illustrate a process of a multi-tier clustering operation according to an exemplary embodiment of the present invention.

Referring to FIG. 6A, a network MIMO operation is performed while being classified according to clusters. Different resources (e.g., frequencies) are allocated while being classified according to tiers 101 and 102.

Referring to FIG. 6B, when user distribution is changed, frequency/time resource allocation between tiers/clusters is changed. In addition, it is possible to perform load balancing between tiers.

Referring to FIG. 6C, it is unnecessary to consider only use of different frequencies/resources between tiers. It is possible to consider generalized resource allocation. A topology is configured to correspond to installation change, addition, and removal of DBSs. It is possible to permit complexity of a suitable level by an operation of a long-term period.

Figure 7:
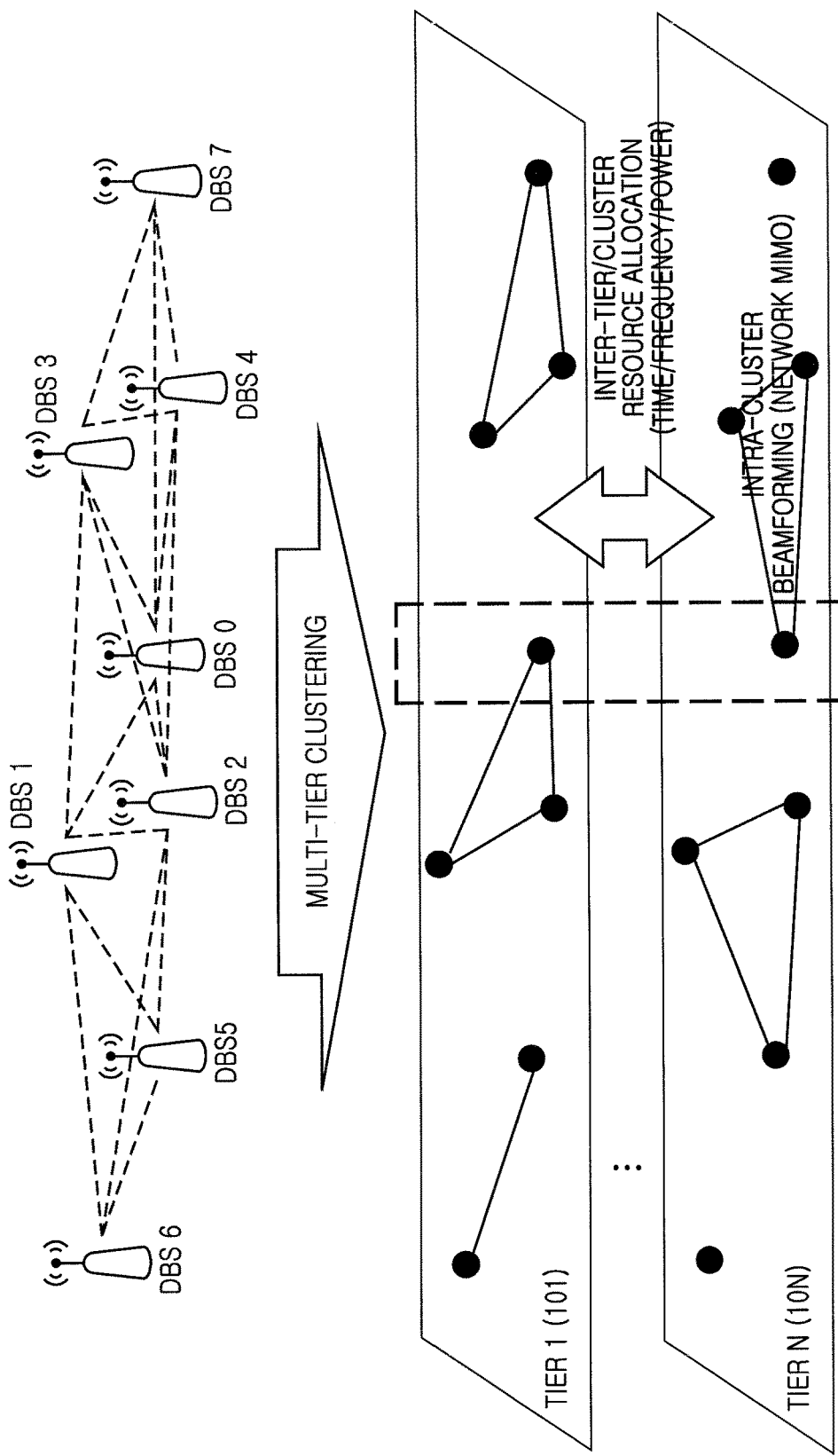
FIG. 7 illustrates a concept to which multi-tier clustering and a resource allocation algorithm are applied according to an exemplary embodiment of the present invention.

FIG. 7 illustrates a concept to which multi-tier clustering and a resource allocation algorithm are applied according to an exemplary embodiment of the present invention.

Referring to FIG. 7, DBSs configure multi-tier cooperative clusters for cooperative transmission and reception. For example, in a tier 1 101, DBSs DBS0 to DBS2 configure one cluster, DBSs DBS3, DBS4, and DBS7 configure one cluster, and DBSs DBS5 and DBS6 configure one cluster. In a tier N 10N, the DBS0, the DBS3, and the DBS4 configure one cluster and the DBS1, the DBS2, and the DBS5 configure one cluster. The DBS0 is included in one cluster of the tier 1 101 and is included in one cluster of the tier N 10N. Accordingly, the DBS0 is included in two or more clusters.

A network MIMO operation, that is, an intra-cluster beamforming operation is performed in the cluster by the DBS0, the DBS3, and the DBS4 of the tier N 10N. The tier 1 101 and the tier N 10N allocate different frequency/time/power resources between tiers and clusters. In another exemplary method, it is possible to consider when the same frequency/time resources are reused between tiers.

Figure 8:
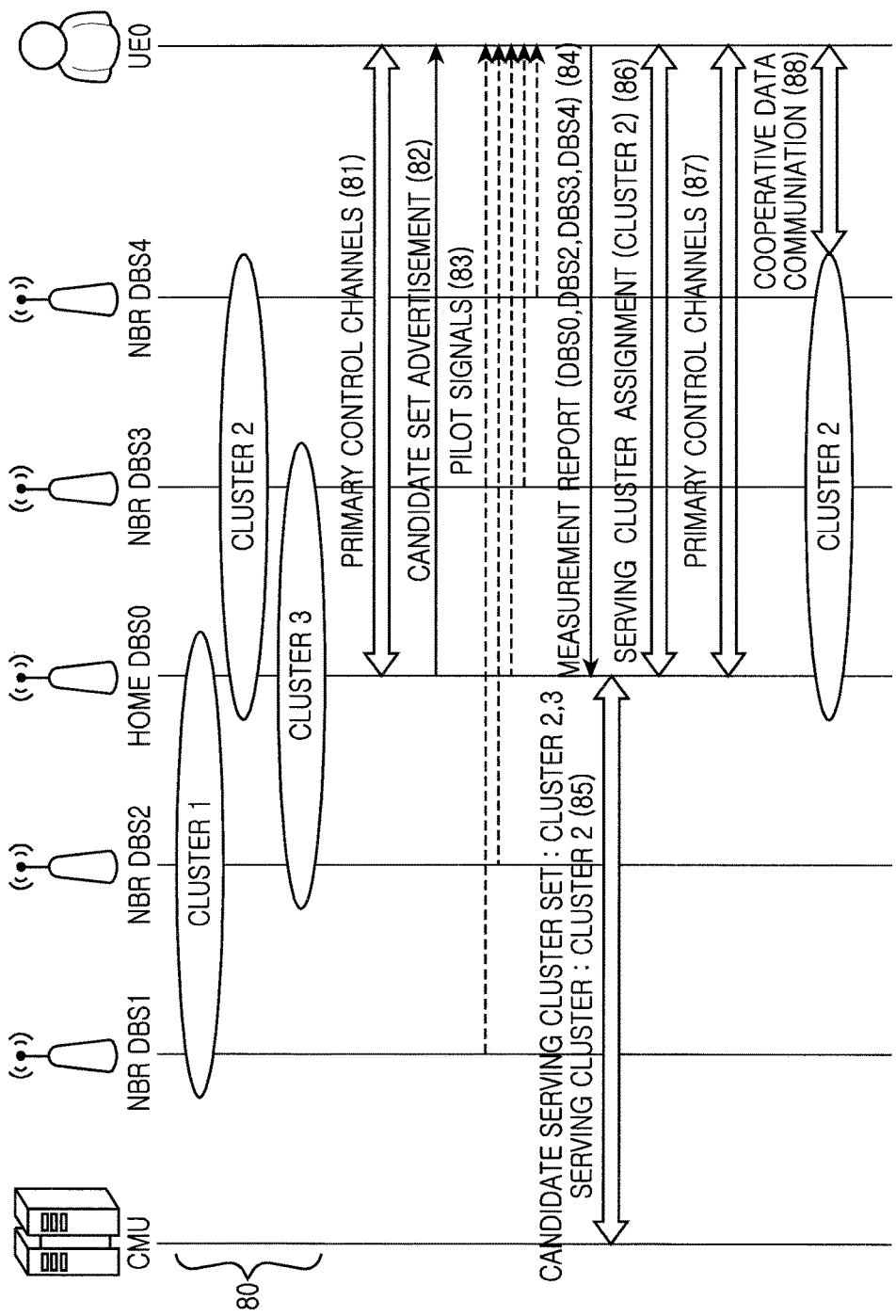
FIG. 8 is a signal sequence diagram illustrating a system operation for determining a cluster for servicing a User Equipment (UE) according to an exemplary embodiment of the present invention.

FIG. 8 is a signal sequence diagram illustrating a system operation for determining a cluster for servicing a UE according to an exemplary embodiment of the present invention.

Referring to FIG. 8, a serving DBS among DBSs transmits a downlink control signal to a UE to perform a cluster selection operation. In step 80, a CMU configures and manages information about clusters in advance. For example, a serving DBS (i.e., a home DBS) DBS0 and neighboring DBSs DBS1 and DBS2 configure a cluster 1. The serving DBS DBS0 and neighboring DBSs DBS3 and DBS4 configure a cluster 2. The serving DBS DBS0 and the neighboring DBSs DBS2 and DBS3 configure a cluster 3.

In step 81, the serving DBS DBS0 configures primary control channels with a UE UE0. In step 82, the serving DBS DBS0 broadcasts candidate cluster set information indicating information about a plurality of clusters including it to the UE UE0. The cluster set information includes corresponding DBS information and information of a transmission and reception method by clusters, and the like. The cluster set information is periodically or intermittently transmitted.

In response to the broadcasting of the cluster set information, in step 83, each of the serving DBS DBS0 and the neighboring DBSs DBS1 to DBS4 generates a pilot signal, which is a downlink control signal, and transmits the generated pilot signal to the UE UE0.

The UE UE0 receives the pilot signals transmitted from the DBSs. It is possible for the UE UE0 to receive a plurality of DBS signals in environments in which a plurality of DBSs are randomly distributed. Herein, if there is a particular preference cluster, it is possible for the UE UE0 to receive only a DBS signal related to the corresponding cluster or receive only signals of predefined RSSI or more. In step 84, the UE UE0 measures an RSSI for each of the pilot signals transmitted from the DBSs and transmits the measured RSSI information to the serving DBS DBS0. For example, the UE UE0 transmits RSSI information about pilot signals received from previously selected DBSs DBS0 and DBS2 to DBS4 to the serving DBS DBS0. Accordingly, the serving DBS DBS0 receives a report of information about RSSIs of control signals transmitted from DBSs included in the plurality of clusters from the UE UE0. The information about the RSSIs of the control signals may include information about DBSs by clusters and a value of an RSSI corresponding to each of DBSs. In another exemplary method, the information about the RSSIs of the control signals may include a value of an RSSI corresponding to each of DBSs by clusters in the order included in the cluster set information.

In step 85, the serving DBS DBS0 transmits the information of the RSSIs of the control signals to the CMU. The CMU determines candidate clusters among the plurality of clusters based on the information about the RSSIs of the control signals and assigns any one of the determined candidate clusters to a cluster for servicing the UE UE0. More specifically, in step 85, the CMU determines the candidate clusters among the clusters based on the information of the RSSIs of the control signals and selects an optimal cluster among the candidate clusters. For example, the cluster 2 and the cluster 3 may be determined on the candidate clusters and the cluster 2 may be selected as an optimal cluster. Information about the optimal cluster is transmitted to the serving DBS DBS0.

In step 86, the serving DBS DBS0 transmits an assignment message indicating that the selected cluster is assigned to a serving cluster for servicing the UE UE0 to the UE UE0. In step 87, the serving DBS DBS0 configures primary control channels. In step 88, the DBS DBS0 performs data transmission and reception with the UE UE0 through a newly assigned cluster 2.

Figure 9:
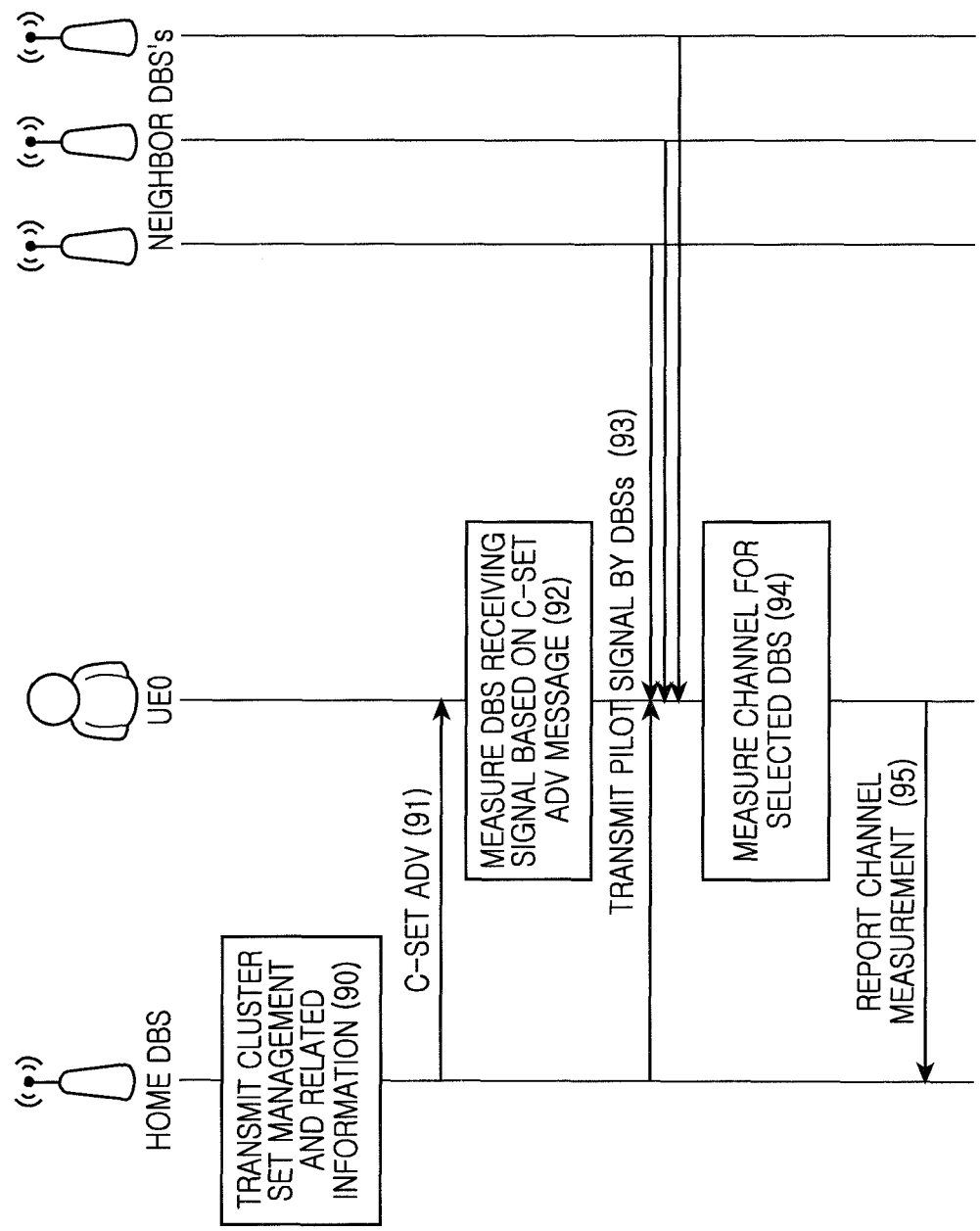
FIGS. 9 and 10 are signal sequence diagrams illustrating a process of transmitting cluster set information at a serving Distributed BS (DBS) and transmitting a response therefor at a UE according to an exemplary embodiment of the present invention.
Figure 10:
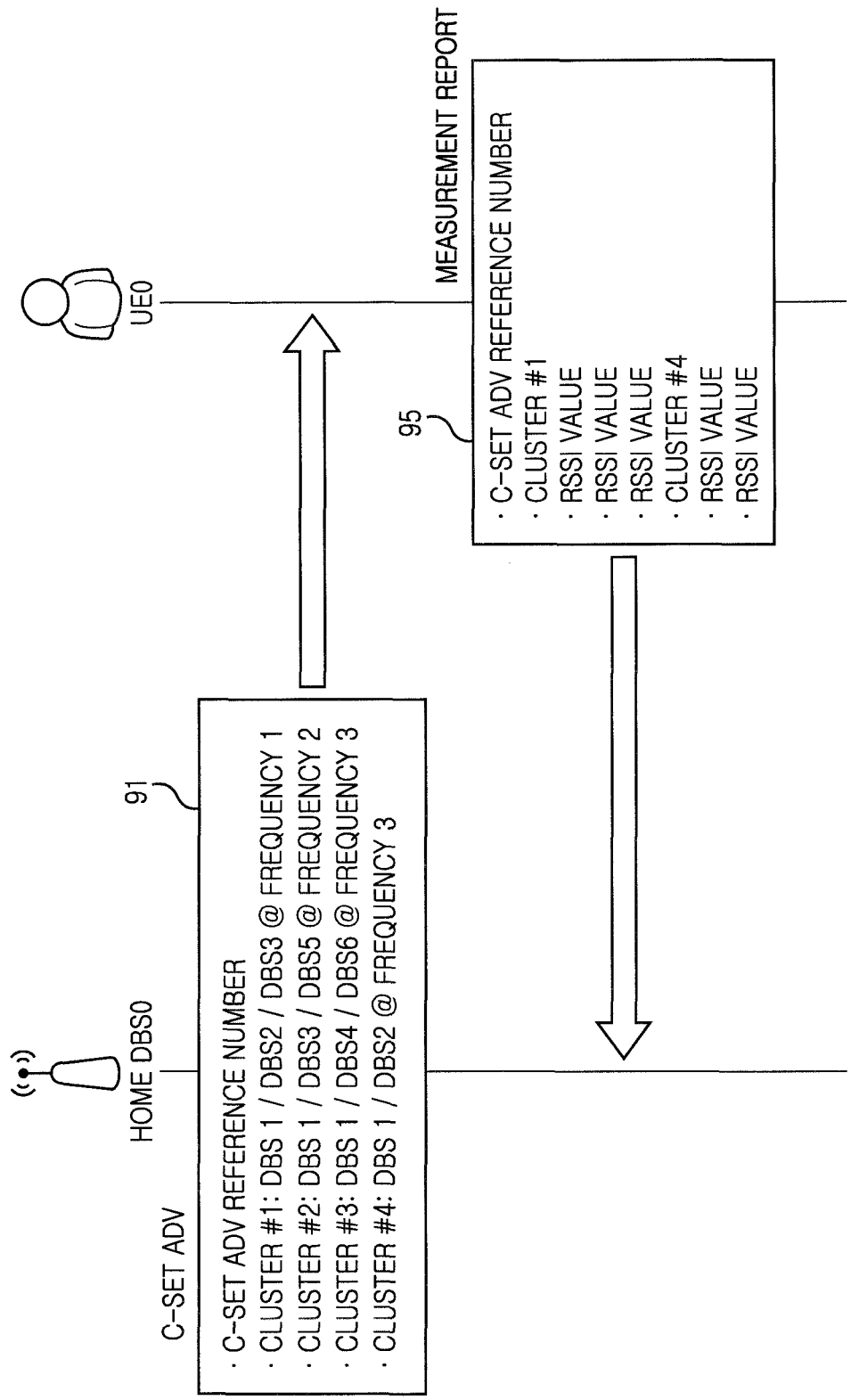

FIGS. 9 and 10 are signal sequence diagrams illustrating a process of transmitting cluster set information at a serving DBS and transmitting a response therefor at a UE according to an exemplary embodiment of the present invention.

Referring to FIGS. 9 and 10, in step 90, the serving DBS DBS0 manages information of clusters including it. In step 91, the serving DBS DBS0 transmits information of related clusters as cluster set information periodically or intermittently. The information of the related clusters includes corresponding DBS information and information of a transmitting and receiving method by clusters, and the like.

For example, in step 91 of FIG. 10, the cluster set information may include a reference number of the cluster set information, and DBS information and frequency information by clusters. A DBS1, a DBS2, and a DBS3 are included in a cluster 1, and DBSs of the cluster 1 perform a transmission and reception operation in a frequency 1. The DBS1, the DBS3, and a DBS5 are included in a cluster 2, and DBSs of the cluster 2 perform a transmission and reception operation in a frequency 2. The DBS1, a DBS4, and a DBS6 are included in a cluster 3, and DBSs of the cluster 3 perform a transmission and reception operation in a frequency 3. The DBS1 and the DBS2 are included in a cluster 4, and DBSs of the cluster 4 perform a transmission and reception operation in the frequency 3.

In step 92, the UE UE0 measures a related DBS receiving signal based on the cluster set information. It is possible for the UE UE0 to receive a plurality of DBS signals in environments in which a plurality of DBSs are randomly distributed. In addition, there is a particular preference cluster, it is possible for the UE UE0 to receive only a DBS signal related to the corresponding cluster. In step 93, each of the serving DBS DBS0 and the neighboring DBSs DBS1 to DBS4 transmits a downlink pilot signal to the UE UE0. In step 94, the UE UE0 measures signal quality (RSSI) for a selected DBS.

In step 95, the UE UE0 reports information about the RSSI to the serving DBS DBS0. When reporting channel measurement in step 95, the information about the RSSI may include cluster information (ID), DBS information (ID), and signal quality information (i.e., an RSSI value). In another exemplary method, it is possible to report a cluster ID and signal quality information by DBSs without a separate DBS ID in the order of DBSs included in the cluster set information. For example, in step 95 of FIG. 10, the UE UE0 reports three RSSI values without a DBS ID with respect to a cluster #1 and reports two RSSI values without a DBS ID with respect to a cluster #4. The three RSSI values for the cluster #1 are RSSI values of signals transmitted from DBSs according to the order included in the cluster set information. A first RSSI value is an RSSI value of a signal transmitted from the DBS1, a second RSSI value is an RSSI value of a signal transmitted from the DBS2, and a third RSSI value is an RSSI value of a signal transmitted from the DBS3. Although the UE UE0 does not report a separate DBS ID, because the serving DBS DBS0 knows the order of DBSs by clusters, it may know whether an RSSI value is an RSSI value of a signal transmitted from any DBS. In this case, the UE UE0 may reduce a length of information transmitted to the serving DBS DBS0.

As described above, each of DBSs broadcasts information about one or more clusters including it while being classified according to DBSs. Receiving interference, a UE measures and reports signals of a serving DBS and neighboring DBSs based on corresponding cluster information.

Figure 11:
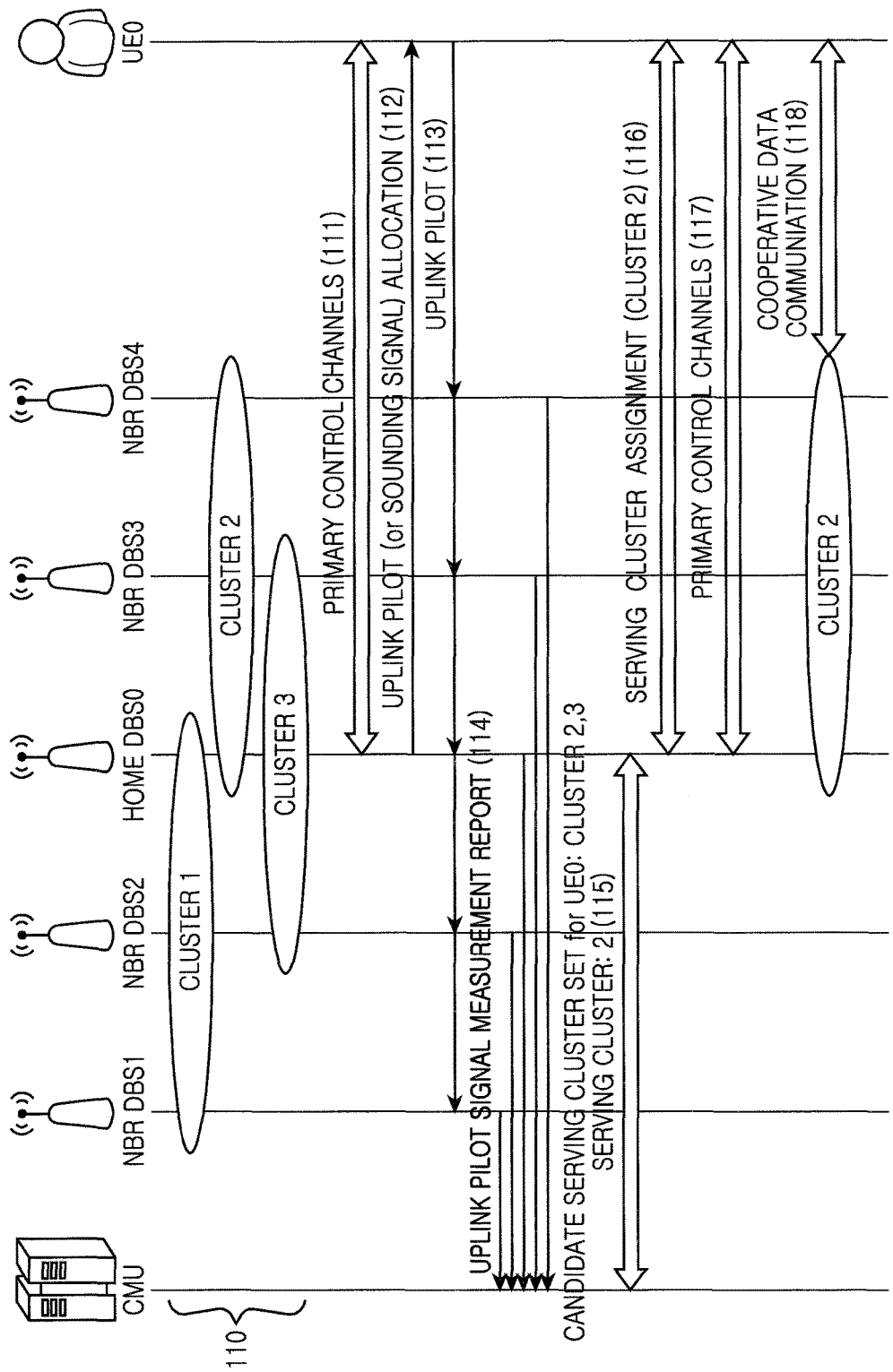
FIG. 11 is a signal sequence diagram illustrating a system operation for determining a cluster for servicing a UE according to an exemplary embodiment of the present invention.

FIG. 11 is a signal sequence diagram illustrating a system operation for determining a cluster for servicing a UE according to an exemplary embodiment of the present invention.

Referring to FIG. 11, a UE transmits an uplink control signal to DBSs to perform a cluster selection operation. In step 110, a CMU configures and manages information about clusters in advance. For example, a serving DBS (i.e., a home DBS) DBS0 and neighboring DBSs DBS1 and DBS2 configure a cluster 1. The serving DBS DBS0 and neighboring DBSs DBS3 and DBS4 configure a cluster 2. The serving DBS DBS0 and the neighboring DBSs DBS2 and DBS3 configure a cluster 3.

In step 111, the serving DBS DBS0 configures primary control channels with a UE UE0. In step 112, the serving DBS DBS0 allocates a pilot or sounding signal which is an uplink control signal to the UE UE0.

In step 113, the UE UE0 broadcasts the pilot signal which is the uplink control signal to the serving DBS DBS0 and the neighboring DBSs DBS1 to DBS4.

In step 114, each of the DBSs DBS0 to DBS4 measures an RSSI of a signal transmitted from the UE UE0 and reports the measured result to the CMU which is an upper node.

In step 115, the CMU receives information about an RSSI transmitted from each of the DBSs, determines candidate clusters among the clusters based on the information about the RSSI, and selects an optimal cluster from the determined candidate clusters. For example, the cluster 2 and the cluster 3 may be determined on the candidate clusters and the cluster 2 may be selected as an optimal cluster. Information about the optimal cluster is transmitted to the serving DBS DBS0.

In step 116, the serving DBS DBS0 transmits an assignment message indicating that the selected cluster is assigned to a serving cluster for servicing a UE to the UE UE0. In step 177, the serving DBS DBS0 configures primary control channels. In step 118, the DBS DBS0 performs data transmission and reception with the UE UE0 through a newly assigned cluster 2.

Figure 12:
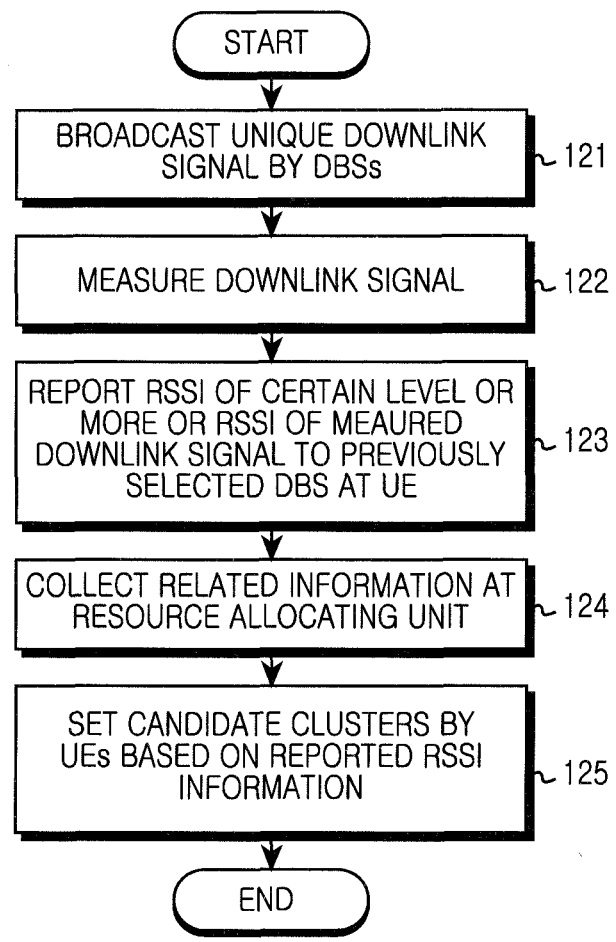
FIG. 12 is a flowchart illustrating a process for managing a candidate serving cluster set while being classified according to users according to an exemplary embodiment of the present invention.

FIG. 12 is a flowchart illustrating a process for managing a candidate serving cluster set while being classified according to users according to an exemplary embodiment of the present invention. The process of FIG. 12 corresponds to the process of FIG. 8.

Referring to FIG. 12, in step 121, each of DBSs broadcasts a unique downlink signal while being classified according to DBSs. In step 122, a UE measures an RSSI of the downlink signal received from each of the DBSs. In step 123, the UE reports an RSSI of a certain level or more, or reports the measured RSSI to a previously selected DBS.

In step 124, the resource allocating unit 402 of the CMU 40 of FIG. 4 collects information related to an RSSI of each of DBSs, which is reported from a serving DBS. In step 125, the resource allocating unit 402 sets candidate clusters while being classified according to UEs based on the reported RSSI information.

Figure 13:
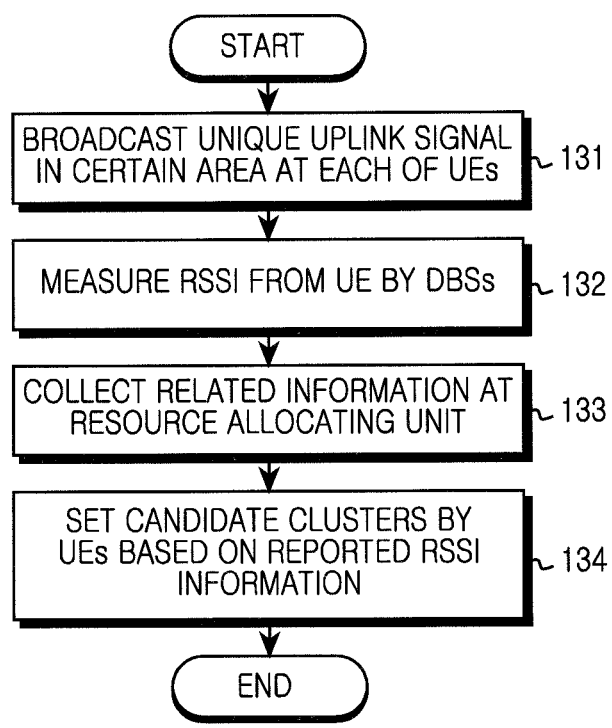
FIG. 13 is a flowchart illustrating a process for managing a candidate serving cluster set while being classified according to users according to an exemplary embodiment of the present invention.

FIG. 13 is a flowchart illustrating a process for managing a candidate serving cluster set while being classified according to users according to an exemplary embodiment of the present invention. The process of FIG. 13 corresponds to the process of FIG. 11.

Referring to FIG. 13, in step 131, each of UEs broadcasts a unique uplink signal in a certain area. In step 132, each of DBSs measures an RSSI of the received uplink signal.

In step 133, the resource allocating unit 402 of the CMU 40 of FIG. 4 collects information related to an RSSI reported from each of the DBSs. In step 134, the resource allocating unit 402 sets candidate clusters while being classified according to UEs based on the reported RSSI information.

Figure 14:
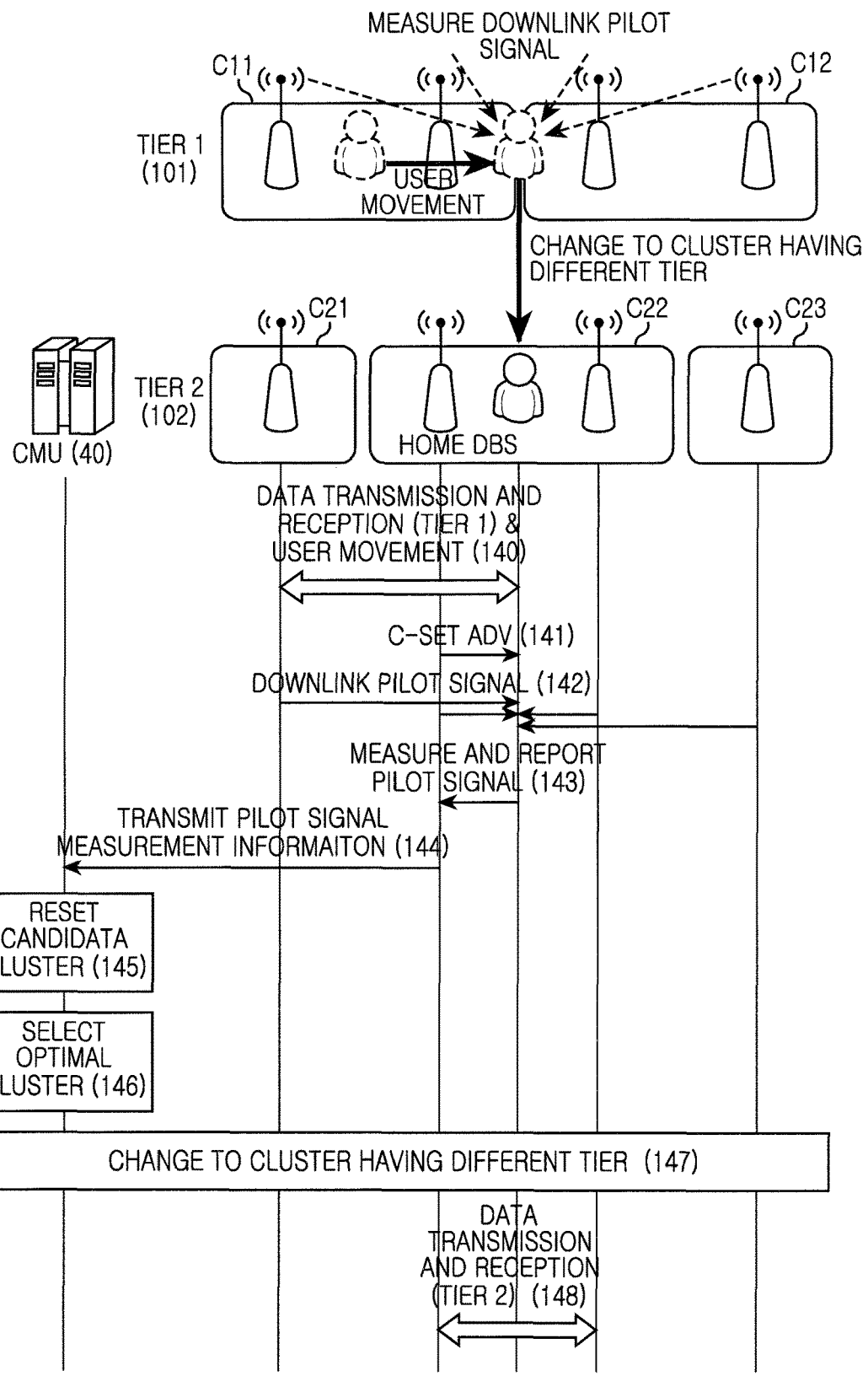
FIG. 14 is a signal sequence diagram illustrating a process for a change operation to a cluster having a different tier users according to an exemplary embodiment of the present invention.

FIG. 14 is a signal sequence diagram illustrating a process for a change operation to a cluster having a different tier according to an exemplary embodiment of the present invention.

Referring to FIG. 14, a home DBS transmits a downlink control signal to a UE to perform a cluster change operation.

In step 140, the UE performs data transmission and reception with DBSs included in a cluster C11 of a tier 1 101. When a user moves from a middle point of the cluster C11 to a boundary region (i.e., a middle point of a cluster 22 of a tier 2 102) between the cluster C11 and a cluster C12 of the tier 1 101 while a data service is performed through the cluster C11, the home DBS broadcasts Cluster-SET ADVanced (C-SET ADV) information indicating information about a plurality of clusters including it to the UE in step 141. In step 142, each of the home DBS and neighboring DBSs transmits a pilot signal which is a downlink control signal to the UE.

In step 143, the UE measures an RSSI of the pilot signal transmitted from each of the home DBS and the neighboring DBSs which are included in a plurality of clusters and reports information (i.e., pilot signal measurement information) about the RSSI indicating the measured result to the home DBS. The information about the RSSI may include information about RSSIs of control signals transmitted from predefined DBSs among DBSs included in the clusters. In one example, the predefined DBSs may be DBSs which transmit a control signal of an RSSI which is greater than a predefined RSSI among the control signals. In another example, the predefined DBSs may be DBSs included in previously selected clusters. The information about the RSSIs of the control signals may include information about DBSs by clusters and a value of an RSSI corresponding to each of DBSs. In another exemplary method, the information about the RSSIs of the control signals may include a value of an RSSI corresponding to each of DBSs by clusters in the order included in the cluster set information.

In step 144, the home DBS receives the information about the RSSIs from the UE and reports the received information to a CMU 40 which is an upper node. In step 145, the CMU resets candidate clusters based on the information about the RSSIs. In step 146, the CMU determines a change to a cluster having a different tier by selecting an optimal cluster among the candidate clusters. When the user is moved, the cluster C22 of the tier 2 102 may be selected as an optimal cluster. When the change of the cluster is determined, a change procedure to a cluster having a different tier is performed in step 147. As shown in FIG. 8, the change procedure of the cluster may include the process of assigning a serving cluster and the process of configuring primary control channels. In step 148, a data service (i.e., transmission and reception) is performed between DBSs included in the cluster C22 of the tier 2 102 and a UE which moves its position.

Figure 15:
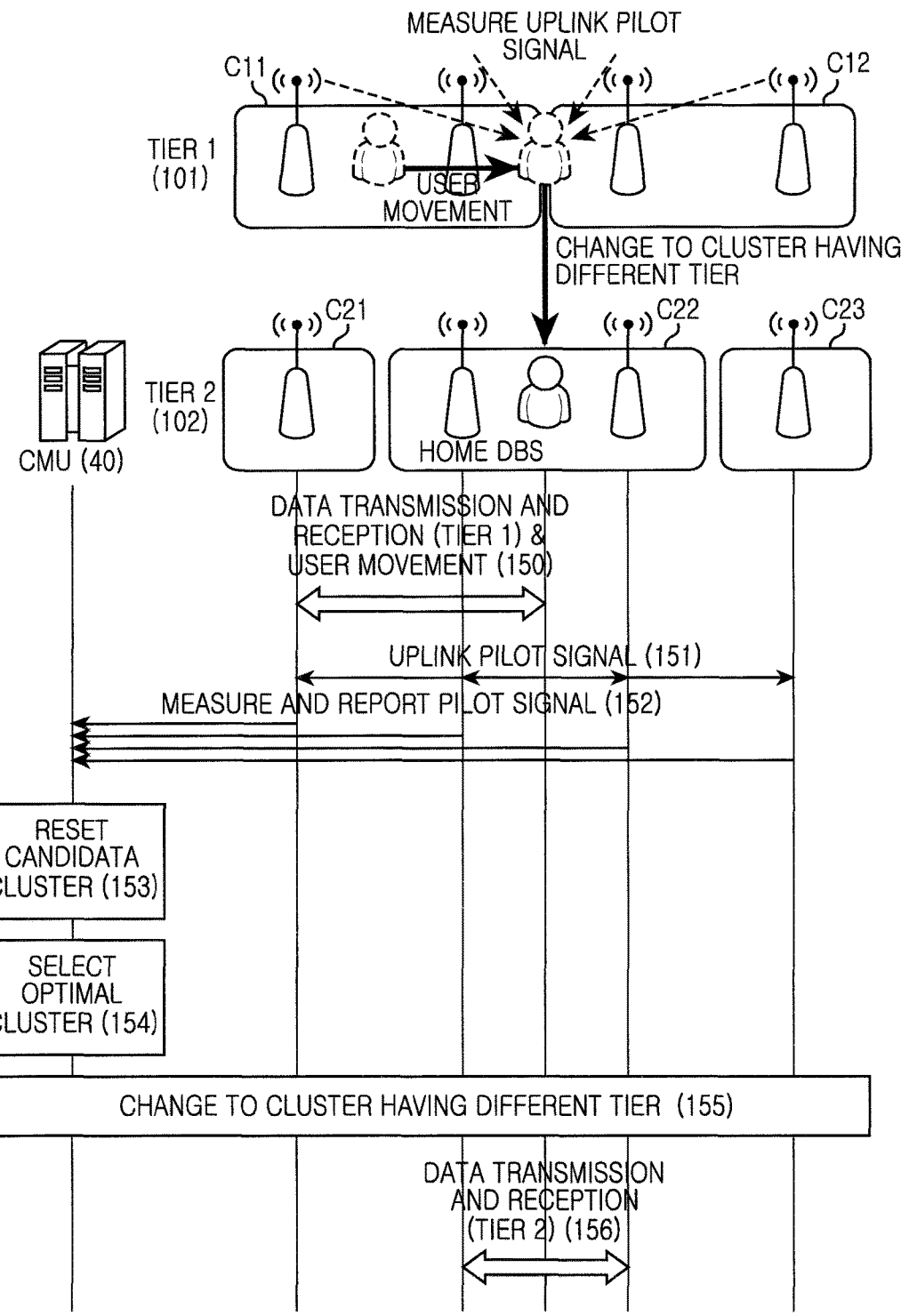
FIG. 15 is a signal sequence diagram illustrating a process for a change operation to a cluster having a different tier according to an exemplary embodiment of the present invention.

FIG. 15 is a signal sequence diagram illustrating a process for a change operation to a cluster having a different tier according to an exemplary embodiment of the present invention.

Referring to FIG. 15, a UE transmits an uplink control signal to a home DBS and neighboring DBSs to perform a cluster change operation.

In step 150, the UE performs data transmission and reception with DBSs included in a cluster C11 of a tier 1 101. When a user moves from a middle point of the cluster C11 to a boundary region (i.e., a middle point of a cluster 22 of a tier 2 102) between the cluster C11 and a cluster C12 of the tier 1 101 while a data service is performed through the cluster C11, the UE broadcasts a pilot signal which is an uplink control signal to home DBS and neighboring DBSs in step 151.

In step 152, each of the home DBS and the neighboring DBSs receives the pilot signal, measures an RSSI of the pilot signal, and transmits the measured result to a CMU 40.

In step 153, the CMU resets candidate clusters based on information about the RSSI. In step 154, the CMU determines a change to a cluster having a different tier by selecting an optimal cluster among the candidate clusters. When the user is moved, the cluster C22 of the tier 2 102 may be selected as an optimal cluster. When the change of the cluster is determined, a change procedure to a cluster having a different tier is performed in step 155. As shown in FIG. 11, the change procedure of the cluster may include the process of assigning a serving cluster and the process of configuring primary control channels. In step 156, a data service (i.e., transmission and reception) is performed between DBSs included in the cluster C22 of the tier 2 102 and a UE which moves its position.

As described above, exemplary embodiments of the present invention may reduce an interference problem between clusters by applying a multi-tier clustering method.

In addition, exemplary embodiments of the present invention may reduce complexity gradually through multi-tier clustering/resource allocation/cooperative multi-antenna transmission and reception. It is possible to perform an operation of a UE/traffic distribution adaptive system.

In addition, exemplary embodiments of the present invention may reduce an overhead of an uplink measurement report message by measuring a neighboring DBS signal of a UE based on cluster set information transmitted from DBSs.

In addition, exemplary embodiments of the present invention may perform quick and efficient load balancing between clusters through a plurality of candidate serving cluster set management by UEs.

In addition, exemplary embodiments of the present invention may perform a systematic operation between multi-antenna cooperative transmission and reception and frequency reuse to address an interference problem between cooperative DBS clusters in a plurality of DBS distribution environments.

Figure 16:
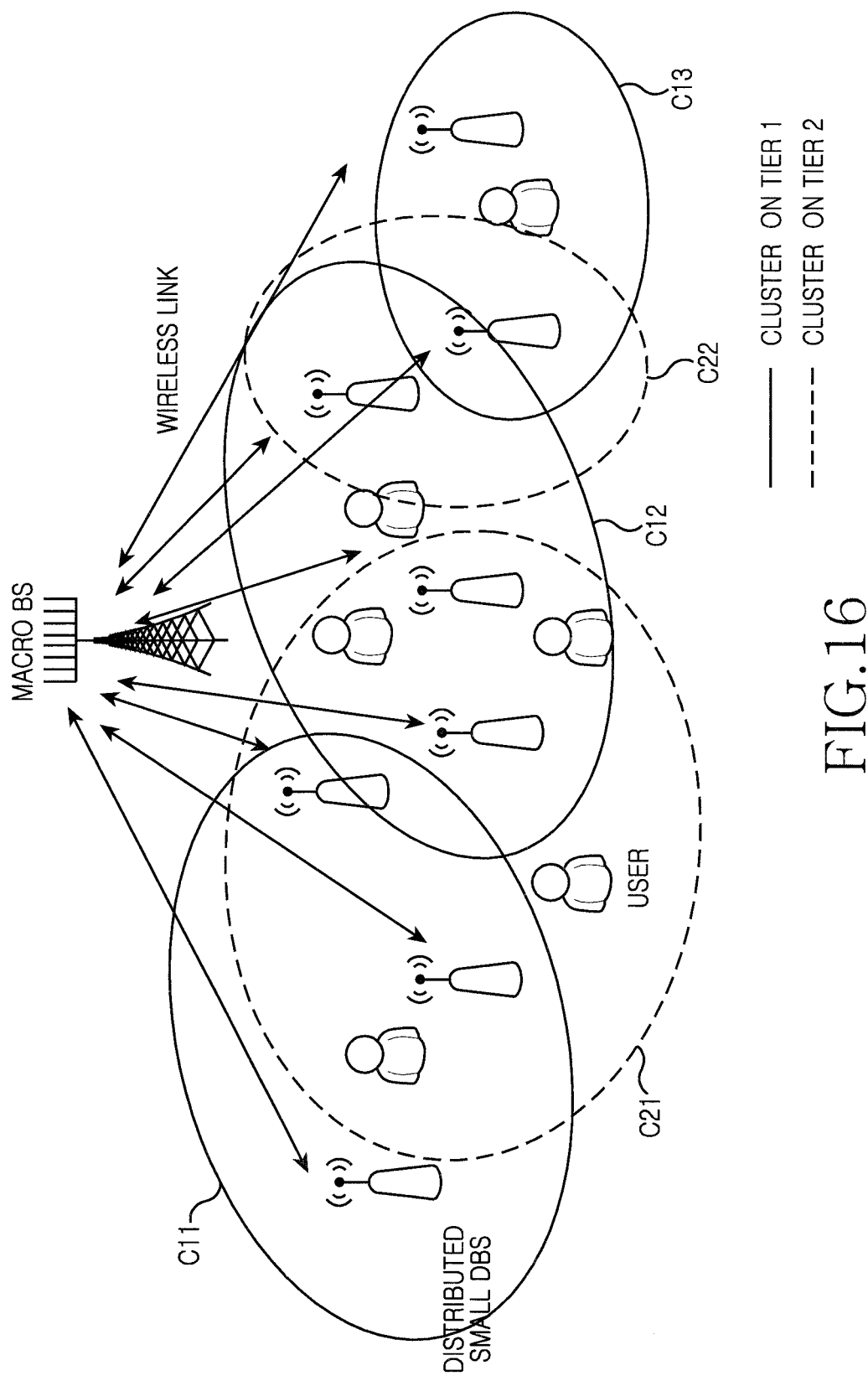
FIGS. 16 through 18 illustrate different applicable environments according to exemplary embodiments of the present invention.
Figure 17:
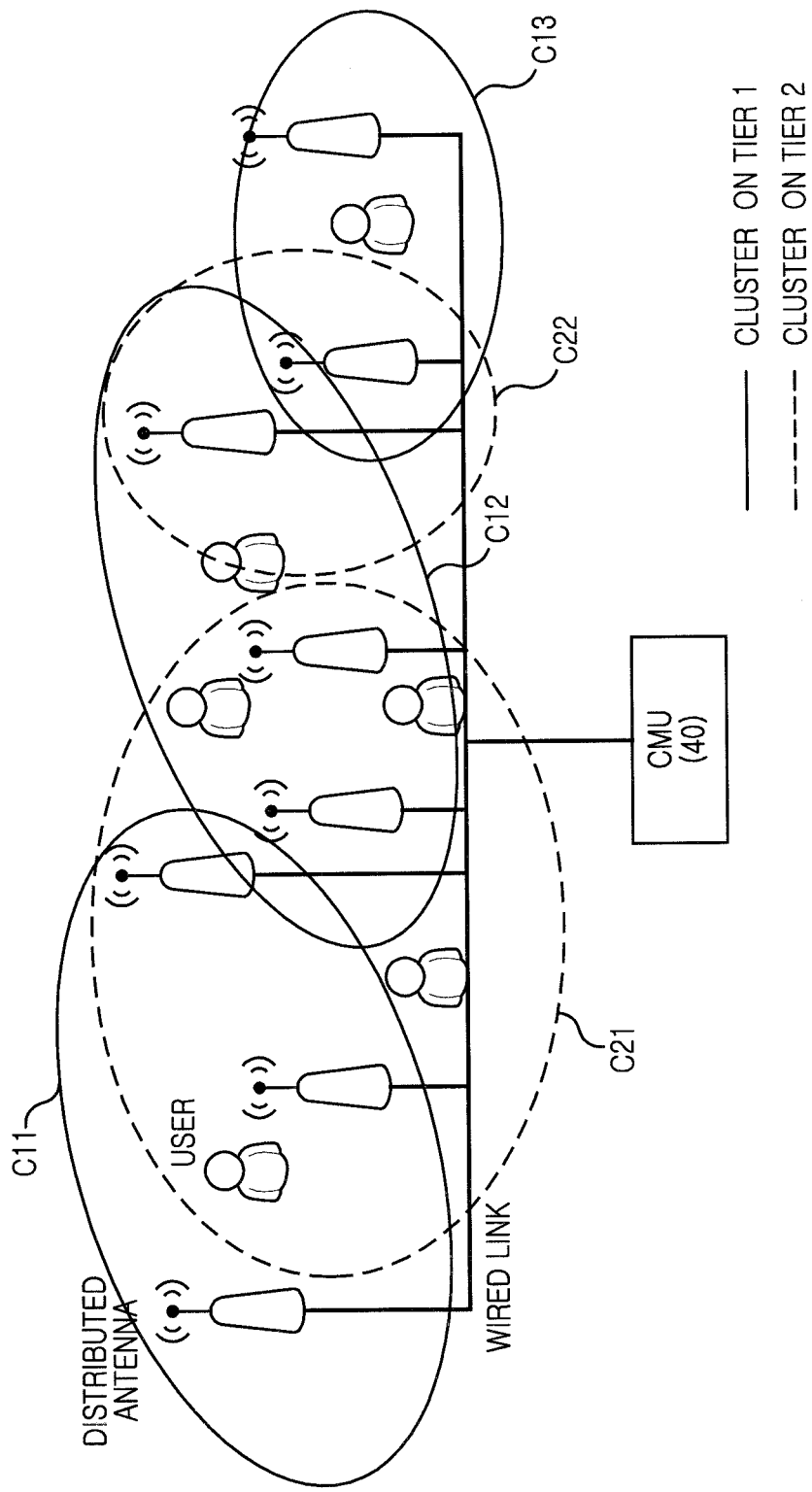
Figure 18:
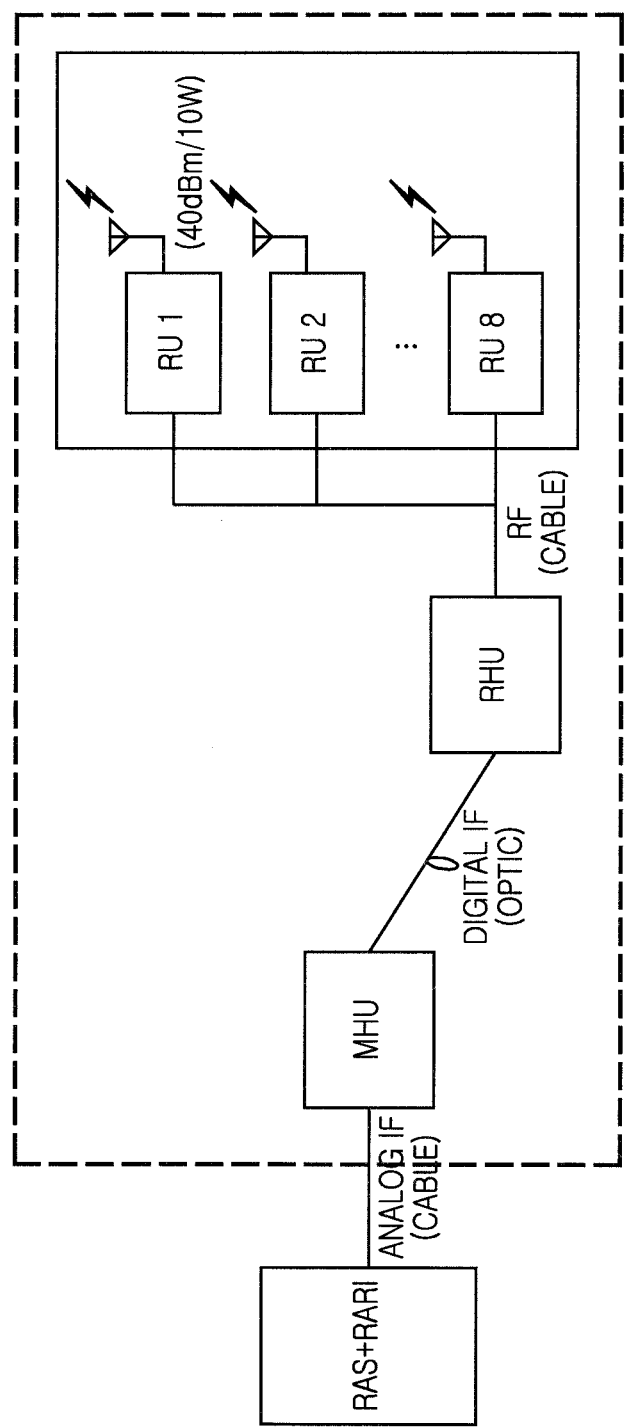

FIGS. 16 through 18 illustrate different applicable environments according to exemplary embodiments of the present invention.

FIG. 16 illustrates an outdoor VCN environment according to exemplary embodiments of the present invention.

Referring to FIG. 16, in accordance with the VCN environment, a plurality of DBSs may be randomly distributed. Each of UEs receives high-capacity wireless data from each of the DBSs. The DBSs are classified into a cluster C11, a cluster C12, and a cluster C13 in a tier 1 (displayed by solid lines) and are classified into a cluster C21 and a cluster C22 in a tier 2 (displayed by dotted lines). The DBSs may be connected to a central control device (central management unit) through wireless backhaul or wired backhaul and may perform intra-cluster cooperative communication. The central control device may be a macro BS which services a larger area.

FIG. 17 illustrates an outdoor distributed antenna environment according to an exemplary embodiment of the present invention.

Referring to FIG. 17, in accordance with the distributed antenna environment, a wireless transmission and reception controller/central controller which processes signals in a baseband is separated from a wireless transceiver. For example, the wireless transceiver may be a distributed antenna and a Remote Radio Head (RRH). The wireless transmission and reception controller/central controller may be a CMU 40.

A plurality of wireless transceivers are physically distributed and positioned from the wireless transmission and reception controller/central controller, and are connected to the wireless transmission and reception controller/central controller through a wired link (e.g., a Radio Frequency (RF) over fiber). The wireless transceivers are classified into a cluster C11, a cluster C12, and a cluster C13 in a tier 1 (displayed by solid lines) and are classified into a cluster C21 and a cluster C22 in a tier 2 (displayed by dotted lines).

FIG. 18 illustrates an in-building wireless network environment according to an exemplary embodiment of the present invention.

Referring to FIG. 18, in accordance with the wireless network environment, a plurality of Remote Hub Unit (RHU)/Remote Units (RUs) are distributed in a building. Cooperation between DBSs/antennas may be performed by a Main Hub Unit (MHU). The RHU and the RUs are connected through an RF (cable), and the RHU and the MHU are connected through an Intermediate Frequency (IF) (optic). The MHU is connected to a Remote Access Server (RAS)+Reporting Activity Routing Identifier (RARI) through an analog IF (cable). The RUs may implement clusters according to distributed types. An indoor VCN is implemented by this wireless network environment.

As described above, while the present invention has been particularly shown and described with reference to exemplary embodiments and drawings thereof, it is not limited to the exemplary embodiments. For example, in an exemplary embodiment of the present invention, an example of selecting a specific cluster from clusters including DBSs under an outdoor VCN environment and performing a change from a cluster of the related art to a different cluster is described. However, exemplary embodiments of the present invention may be equally applied in an outdoor distributed antenna environment including a plurality of units which cooperate with each other and perform a transmission and reception function and an in-building wireless network environment to be similar with the outdoor VCN environment.

On the other hand, operations according to exemplary embodiments of the present invention may be recorded in a computer readable medium including program instructions for performing operations implemented by various computers. The computer readable medium may include program instructions, data files, data structures, and the like, separately or by combination of them. The program instructions may be particularly designed and configured for the present invention, or is well known to those skilled in the art and may be used. The computer readable medium includes any one of magnetic media, such as a hard disc, a floppy disc, and a magnetic tape, an optical recording media, such as Compact Disc-Read Only Memories (CD-ROMs) or Digital Video Discs (DVDs), a magneto-optical media, such as floptical discs, and hardware devices, such as a ROM, a Random Access Memory (RAM), and a flash memory, to be particularly configured to store and perform program instructions. The program instructions include machine language codes, such as codes generated by compilers and high-level language codes capable of being executed by computers using an interpreter, and the like. When all or some of BSs and relays described in exemplary embodiments of the present invention are implemented by a computer program, a computer readable medium which stores the computer program is also included in the present invention.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method in a serving base station (BS) in a wireless communication system, the method comprising:
   transmitting, to a terminal, information regarding a plurality of clusters, each of the plurality of clusters including the serving BS and at least one neighboring BS connected to the serving BS through a backhaul link;
   receiving, from the terminal, information regarding received signal strength for control signals transmitted from BSs included in each of the plurality of clusters;
   transmitting, to an upper node, the information regarding the received signal strength;
   receiving, from the upper node, information regarding an optimal cluster selected from among the plurality of clusters based on the information of the received signal strength;
   determining a cluster selected from among the plurality of clusters as a serving cluster for servicing the terminal, based on the information about the optimal cluster; and
   communicating with the terminal by cooperating with at least one BS included in the serving cluster through the backhaul link.

2. The method of claim 1, further comprising:
   receiving, from each of the at least one neighboring BS, information regarding received signal strength of signal transmitted from the terminal;
   determining a cluster selected from among the plurality of clusters as a serving cluster for servicing the terminal, based on the information of the received signal strength of the signal.

3. The method of claim 2,
   wherein the each of the at least one neighboring BS is a BS which transmits a control signal with received signal strength which is greater than a predefined signal strength among the control signals, or
   wherein the each of the at least one neighboring BS is a BS included in previously selected clusters.

4. The method of claim 2,
   wherein the information of the received signal strength includes information about BSs by clusters and a value of received signal strength corresponding to each of the BSs, or
   wherein the information regarding the received signal strength includes a value of the received signal strength corresponding to each of the BSs by clusters in an order included in the information regarding the plurality of clusters.

5. The processing method of claim 1,
   wherein the transmitting of the information regarding the plurality of clusters is periodically or intermittently performed, or
   wherein the transmitting of the information regarding the plurality of clusters is performed when a position of the terminal is moved.

6. The method of claim 1, further comprising: transmitting information about the serving cluster to the terminal.

7. A method in a terminal in a wireless communication system, the method comprising:
   receiving, from a serving base station (BS), information regarding a plurality of clusters, each of the plurality of clusters including the serving BS and at least one neighboring BS connected to the serving BS through a backhaul link;
   transmitting, to the serving BS, information of received signal strength regarding control signals transmitted from BSs included in each of the plurality of clusters; and
   communicating with the serving BS which is cooperating, through the backhaul link, with at least one BS included in a cluster selected from among the plurality of clusters as a serving cluster, based on information about an optimal cluster,
   wherein the optimal cluster is selected from among the plurality of clusters based on the information of the received signal strength.

8. The method of claim 7, wherein the information regarding the received signal strength includes information about received signal strength for control signals transmitted from predefined BSs among the BSs included in each of the plurality of clusters.

9. The method of claim 8,
   wherein the predefined BSs are BSs which transmit a control signal with received signal strength which is greater than a predefined signal strength among the control signals, or
   wherein the predefined BSs are BSs included in previously selected clusters.

10. The method of claim 8,
    wherein the information of the received signal strength includes information about BSs by clusters and a value of received signal strength corresponding to each of the BSs, or
    wherein the information of the received signal strength includes a value of the received signal strength corresponding to each of the BSs by clusters in an order included in the information regarding the plurality of clusters.

11. The method of claim 8, further comprising:
    receiving information about the serving cluster from the serving BS.

12. The processing method of claim 7,
    wherein the receiving of the information regarding the plurality of clusters is periodically or intermittently performed, or
    wherein the receiving of the information regarding the plurality of clusters is performed when a position of the terminal is moved.

13. A serving base station (BS) apparatus in a wireless communication system, the apparatus comprising:
    a transceiver; and
    a processor coupled to the transceiver,
    wherein the processor is configured to:
       transmit, to a terminal, information regarding a plurality of clusters, each of the plurality of clusters including the serving BS and at least one neighboring BS connected to the serving BS through a backhaul link;

receive, from the terminal, information of received signal strength for control signals transmitted from BSs included in each of the plurality of clusters;

transmit, to an upper node, the information regarding the received signal strength;

receive, from the upper node, information about an optimal cluster selected from among the plurality of clusters based on the information of the received signal strength;

determine a cluster selected from among the plurality of clusters as a serving cluster for servicing the terminal, based on the information about the optimal cluster; and communicate with the terminal by cooperating with at least one BS included in the serving cluster through the backhaul link.

14. The apparatus of claim 13, wherein the processor is further configured to:

receive, from each of the at least one neighboring BS, information regarding received signal strength of signal transmitted from the terminal;

determine a cluster selected from among the plurality of clusters as a serving cluster for servicing the terminal, based on the information of the received signal strength of the signal.

15. The apparatus of claim 14, wherein the each of the at least one neighboring BS is a BS which transmits a control signal with received signal strength which is greater than a predefined signal strength among the control signals, or wherein the each of the at least one neighboring BS is a BS included in previously selected clusters.

16. The apparatus of claim 14, wherein the information of the received signal strength includes information about BSs by clusters and a value of received signal strength corresponding to each of the BSs, or wherein the information of the received signal strength includes a value of the received signal strength corresponding to each of the BSs by clusters in an order included in the information regarding the plurality of clusters.

17. The serving BS apparatus of claim 13, wherein the information regarding the plurality of clusters is periodically or intermittently transmitted to the terminal, or wherein the information regarding the plurality of clusters is transmitted to the terminal when a position of the terminal is moved.

18. The apparatus of claim 13, wherein the processor is further configured to transmit information about the serving cluster to the terminal.

19. A terminal apparatus in a wireless communication system, the apparatus comprising:

a transceiver; and a processor coupled to the transceiver, wherein the processor is configured to:

receive, from a serving base station (BS), information regarding a plurality of clusters, each of the plurality of clusters including the serving BS and at least one neighboring BS connected to the serving BS through a backhaul link;

transmit, to the serving BS, information of received signal strength for control signals transmitted from BSs included in each of the plurality of clusters; and communicate with the serving BS which is cooperating, through the backhaul link, with at least one BS included in a cluster selected from among the plurality of clusters as a serving cluster, based on information about an optimal cluster, wherein the optimal cluster is selected from among the plurality of clusters based on the information of the received signal strength.

20. The apparatus of claim 19, wherein the information of the received signal strength includes information about received signal strength for control signals transmitted from predefined BSs among the BSs included in each of the plurality of clusters.

21. The apparatus of claim 20, wherein the predefined BSs are BSs which transmit a control signal with received signal strength which is greater than a predefined strength among the control signals, or wherein the predefined BSs are BSs included in previously selected clusters.

22. The apparatus of claim 20, wherein the information of the received signal strength includes information about BSs by clusters and a value of received signal strength corresponding to each of the BSs, or wherein the information of the received signal strength includes a value of the received signal strength corresponding to each of the BSs by clusters in an order included in the information regarding the plurality of clusters.

23. The apparatus of claim 19, wherein the information regarding the plurality of clusters is periodically or intermittently received, or wherein the information regarding the plurality of clusters is received when a position of the terminal is moved.

24. The apparatus of claim 19, wherein the processor is further configured to receive information about the serving cluster from the serving BS.

* * * * *